United States Patent
Kim et al.

(10) Patent No.: US 11,605,113 B2
(45) Date of Patent: Mar. 14, 2023

(54) METHOD FOR DYNAMICALLY RECOMMENDING CATALOG AND ELECTRONIC DEVICE THEREOF

(71) Applicant: Samsung Electronics Co., Ltd., Gyeonggi-do (KR)

(72) Inventors: Namjin Kim, Gyeonggi-do (KR); Junghwan Song, Gyeonggi-do (KR); Sanghyun Park, Gyeonggi-do (KR); Yoechan Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 16/727,074

(22) Filed: Dec. 26, 2019

(65) Prior Publication Data

US 2020/0211073 A1 Jul. 2, 2020

(30) Foreign Application Priority Data

Dec. 26, 2018 (KR) .......................... 10-2018-0169612

(51) Int. Cl.
*G06Q 30/00* (2012.01)
*G06Q 30/0601* (2023.01)
*H04L 12/28* (2006.01)

(52) U.S. Cl.
CPC ...... *G06Q 30/0603* (2013.01); *G06Q 30/0629* (2013.01); *G06Q 30/0631* (2013.01); *G06Q 30/0643* (2013.01); *H04L 12/2807* (2013.01)

(58) Field of Classification Search
CPC .......... G06Q 30/0603; G06Q 30/0629; G06Q 30/0631; G06Q 30/0643; H04L 12/2807

(Continued)

(56) References Cited

U.S. PATENT DOCUMENTS

| 7,113,917 B2 | 9/2006 | Jacobi et al. |
| 2008/0295132 A1* | 11/2008 | Icho .................... H04N 21/8405 348/E7.061 |

(Continued)

FOREIGN PATENT DOCUMENTS

| JP | 2014-102782 A | 6/2014 |
| KR | 10-2016-0083746 A | 7/2016 |
| KR | 10-2018-0047489 A | 5/2018 |

OTHER PUBLICATIONS

A. M. Otebolaku and M. T. Andrade, "Supporting Context-Aware Cloud-Based Media Recommendations for Smartphones," 2014 2nd IEEE International Conference on Mobile Cloud Computing, Services, and Engineering, 2014, pp. 109-116, doi: 10.1109/MobileCloud.2014.26. (Year: 2014).*

(Continued)

*Primary Examiner* — Anand Loharikar
(74) *Attorney, Agent, or Firm* — Cha & Reiter, LLC

(57) ABSTRACT

An electronic device and method are disclosed. The device includes a communication module, at least one processor operatively coupled to the communication module, and at least one memory. The processor implements the method, including: retrieving a plurality of service categories, each service category listing services providable to a user using one or more smart devices, and each service category associated with a service capability list of one or more elements indicating whether each service category is to be recommended to the user, receiving user-related information from the external device through the communication module and updating a service capability list of a user using the user-related information, and selecting a service category from among the retrieved plurality of service categories to be recommended to the user by comparing the updated service capability list of the user with the service capability (Continued)

lists associated with each of the plurality of service categories.

17 Claims, 18 Drawing Sheets

(58) Field of Classification Search
USPC .............................................. 705/26.1–27.2
See application file for complete search history.

(56) References Cited

U.S. PATENT DOCUMENTS

| | | |
|---|---|---|
| 2012/0303477 A1 | 11/2012 | Ben-Itchak |
| 2014/0172652 A1 | 6/2014 | Pobbathi et al. |
| 2017/0262923 A1* | 9/2017 | Bute ...................... H04W 4/23 |

OTHER PUBLICATIONS

International Search Report dated Apr. 21, 2020.

* cited by examiner

METHOD FOR DYNAMICALLY RECOMMENDING CATALOG AND ELECTRONIC DEVICE THEREOF

CROSS-REFERENCE TO RELATED APPLICATION(S)

This application is based on and claims priority under 35 U.S.C. 119 to Korean Patent Application No. 10-2018-0169612, filed on Dec. 26, 2018, in the Korean Intellectual Property Office, the disclosure of which is herein incorporated by reference in its entirety.

BACKGROUND

1) Field

Certain embodiments relate to smart-device recommendations, and, more particular, to recommending smart-functionality to a user based on user information and the presence of installed smart-devices.

2) Description of Related Art

Users today can browse for products they wish to purchase and use by browsing through catalogs provided by application stores or Internet shopping malls. When a specific catalog is combined with Internet of Things (IoT) technology, a user may receive a catalog of various products provided by vendors and may select them from among the catalog. Here, the "things" and products referenced may sometimes be smart home or hardware products that are connectable to the Internet, including controllers, electronic devices, etc. Further, "smart" home appliances are on the rise, and include smart and Internet-enabled washing machines, televisions, refrigerators, etc. which nowadays further include various sensors, such as a temperature sensor, a humidity sensor, a heat sensor, a gas sensor, an illuminance sensor, or an ultrasonic sensor, which can provide diverse information to a user. Increasingly, these can all interoperate and intercommunicate.

The above information is presented as background information only to assist with an understanding of the disclosure. No determination has been made, and no assertion is made, as to whether any of the above might be applicable as prior art with regard to the disclosure.

SUMMARY

Conventionally, the same catalog is provided to all users, thus making it difficult for a user to select and use a service suitable for him or herself. Further, a user may select a wrong service and may thus has a problem with installing and attempting to use the service.

Certain embodiments propose a method for providing a catalog including a service to be dynamically recommended depending on user conditions and an electronic device thereof.

According to certain embodiments, an electronic device may include: a communication module configured to communicate with an external device, at least one processor operatively coupled to the communication module, and at least one memory operatively coupled to the at least one processor, wherein the at least one memory stores instructions executable by the at least one processor to cause the electronic device to: retrieve a plurality of service categories, each service category listing services providable to a user using one or more smart devices, and each service category associated with a service capability list of one or more elements indicating whether each service category is to be recommended to the user, receive user-related information from the external device through the communication module and updating a service capability list of a user using the user-related information, and select a service category from among the retrieved plurality of service categories to be recommended to the user by comparing the updated service capability list of the user with the service capability lists associated with each of the plurality of service categories.

According to certain embodiments, an electronic device may include: a communication module configured to communicate with an external device, a display device, at least one processor operatively coupled to the communication module and the display device, and at least one memory operatively coupled to the at least one processor, wherein the at least one memory stores instructions executable by the at least one processor cause the electronic device to: receive a transmission indicating a recommended service category and/or a recommended service using the communication module, retrieve at least one of information about at least one service belonging to the recommended service category and/or information about the recommended service, generate a user interface (UI) catalog guide for display based on the generated information about the at least one service and/or the generated information about the recommended service, the generated UI catalog guide including at least one of a list and a pop-up window, and display the generated UI catalog guide on the display device.

According to certain embodiments, an operating method of an electronic device may include: retrieve a plurality of service categories, each service category listing services providable to a user using one or more smart devices, and each service category associated with a service capability list of one or more elements indicating whether each service category is to be recommended to the user, wherein the plurality of service categories are retrieved from a transmission received by a communication module, or by extraction from a local memory, receiving user-related information from the external device through the communication module, and updating, by a processor, a service capability list of a user using the received user-related information, and selecting a service category from among the retrieved plurality of service categories to be recommended to the user by comparing, using the processor, the updated service capability list of the user with the service capability lists associated with each of the plurality of service categories.

A method and an electronic device thereof according to certain embodiments may provide a catalog for recommending a service suitable for a user or displaying services arranged according to priority.

Accordingly, a service optimized for the user's situation may be recommended to the user, thus reducing problems and improving the user's convenience.

BRIEF DESCRIPTION OF THE DRAWINGS

The above and other aspects, features, and advantages of certain embodiments of the disclosure will be more apparent from the following description taken in conjunction with the accompanying drawings, in which.

In the description of the drawings, equivalent or similar reference numerals may be used to refer to equivalent or similar elements.

DETAILED DESCRIPTION

Hereinafter, certain embodiments will be described in detail with reference to the accompanying drawings.

Figure 1:
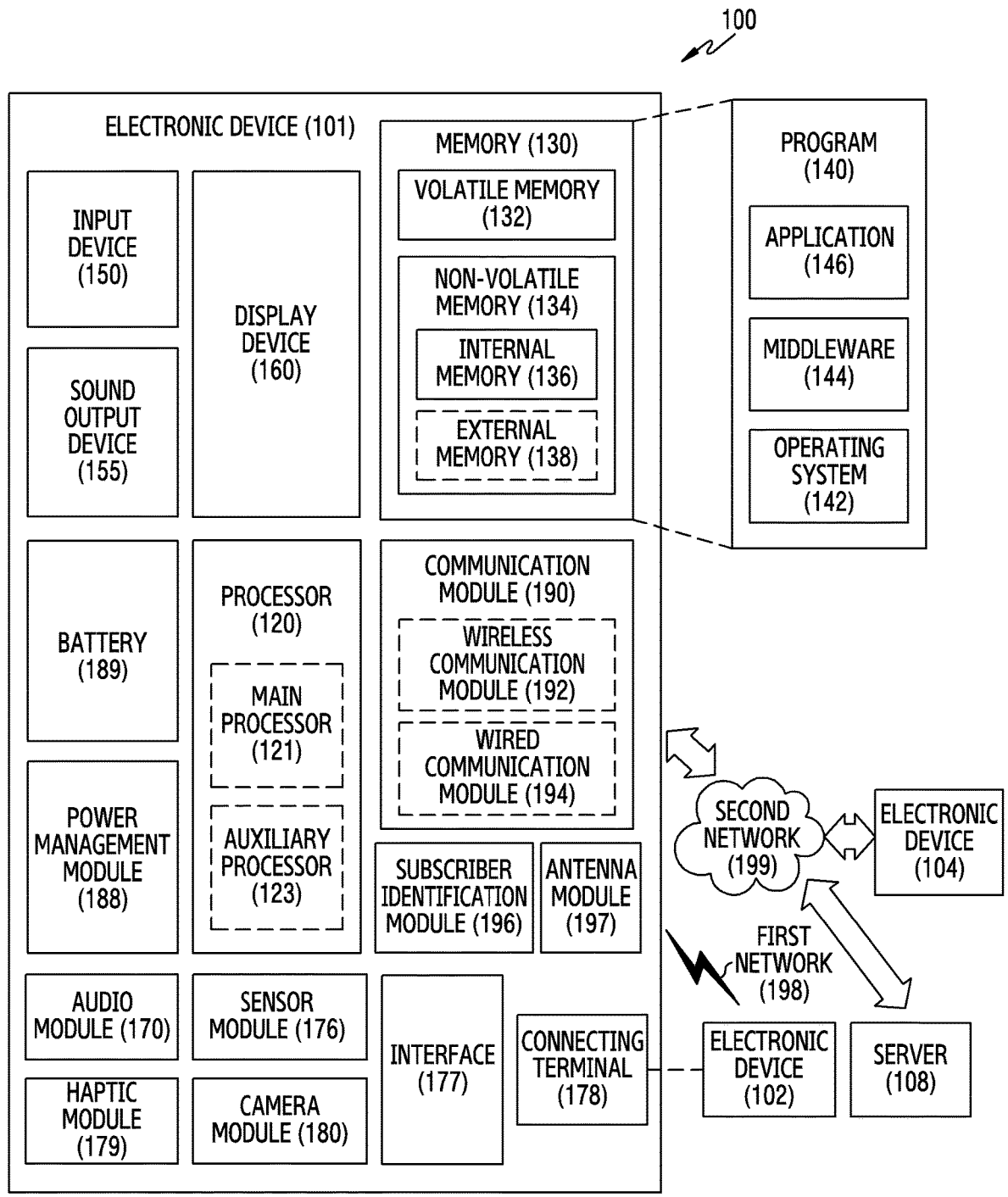
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
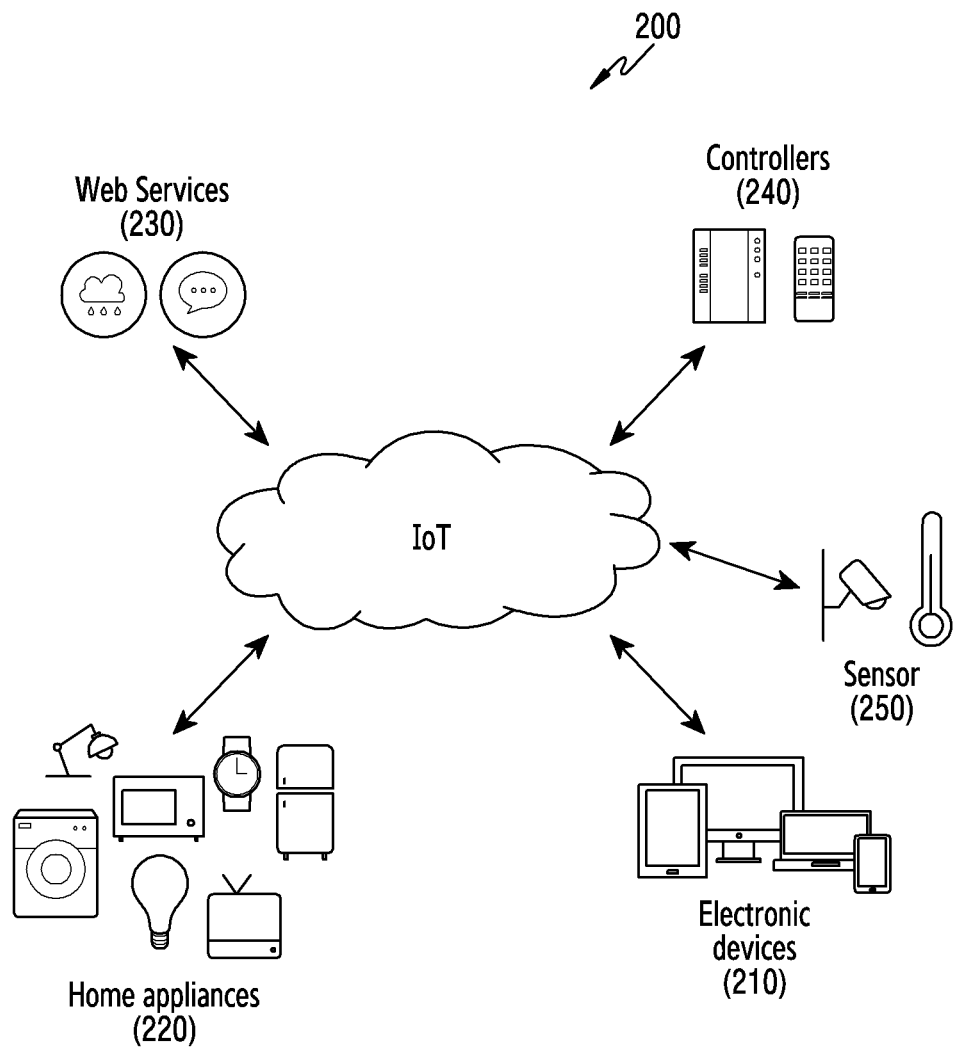
FIG. 2 illustrates an example of a user's Internet of Things (IoT) cloud.

FIG. 2 illustrates an example 200 of a user's Internet of Things (IoT) cloud 200.

A user may form a personal IoT cloud by connecting all Internet-connectable things through the Internet. The user may form an IoT cloud by connecting not only electronic devices 210, such as a smartphone, tablet PC, laptop, or PC thereof, but also home appliances 220, such as a TV, a refrigerator, a washing machine, or a light, various sensors 250, such as a CCTV, a temperature sensor, a gas leak sensor, or a fire sensor, and various controllers 240, such as a heating controller or a door lock controller, via the Internet. In addition, the user may form an IoT cloud by connecting various services 230 existing on Internet webs, for example, a weather service, a location information providing service, a social networking service (SNS), or a blog.

A user's IoT cloud may be part of an integrated IoT cloud in which IoT clouds of a plurality of users are combined. Alternatively, a user's IoT cloud may be a secure IoT cloud for each user in an IoT cloud framework for a plurality of users.

The user may use services for using various devices connected when the IoT cloud is formed, and these services may be particular services downloaded on the Internet. In this environment, rather than providing the same service catalog to all users, an appropriate service catalog for each user may be provided on the basis of devices that the user has, events generated by the user, or events generated by various devices or services in the IoT cloud, thereby securing convenience of the user.

Certain embodiments relate to a method for dynamically providing an appropriate service catalog (e.g., a visual guide) to a user on the basis of a user-related event as described above and an electronic device thereof.

Although the following description will be made with reference to a service, it would be obvious that this description is not limited to dynamically providing a catalog of a service to a user but may also be applied to dynamically providing a catalog of a device or an object to a user.

Figure 3:
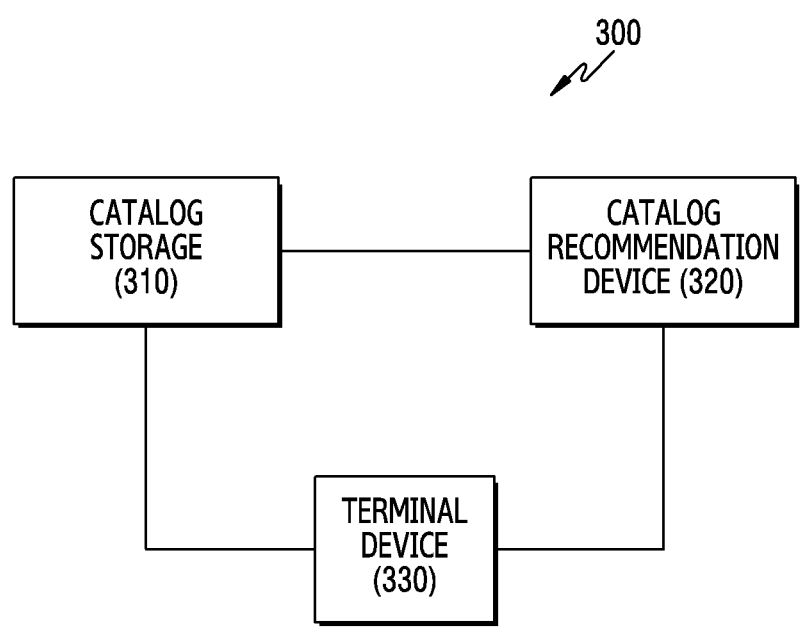
FIG. 3 is a block diagram illustrating a system for dynamically providing a catalog to a user according to certain embodiments.

FIG. 3 is a block diagram 300 illustrating a system for dynamically providing a catalog to a user according to certain embodiments.

Referring to FIG. 3, the system for dynamically providing the catalog to the user according to certain embodiments may include a catalog storage 310, a catalog recommendation device 320, and a terminal device 330. The terminal device 330 may correspond to the electronic device 101 of FIG. 1 or the electronic device 210 of FIG. 2, and the catalog storage 310 and the catalog recommendation device 320 may correspond to the server 108 of FIG. 1, without being limited thereto. Alternatively, the catalog storage 310, the catalog recommendation device 320, and the terminal device 330 may be configured within a single device, and may be included in the operations of electronic device 101 of FIG. 1 or an electronic device 210 of FIG. 2. In another embodiment, the catalog recommendation device 320 may be configured to be included, together with the terminal device 330, in the electronic device 101 of FIG. 1 or the electronic device 210 of FIG. 2. In still another embodiment, the catalog storage 310 and the catalog recommendation device 320 may be configured in one server.

The terminal device 330 may interoperate within the IoT cloud (e.g., as illustrated in the IoT of the user illustrated in FIG. 2) but is not limited thereto. The catalog storage 310 and the catalog recommendation device 320 may also operate within the IoT cloud of the user illustrated in FIG. 2, but in other embodiments, may also exist outside the IoT cloud of the user to communicate with a device, an application, or a service in the IoT cloud of the user.

According to certain embodiments, the catalog storage 310 may include a data server that stores information about services displayable in a catalog. The services to be displayed in the catalog, which are shown to the user, may be stored in a tree format in the catalog storage 310. In an embodiment, a service category may be designated, and information about a service may be stored in the catalog storage 310 in a tree format in which each service exists under the service category. Here, one service may be included in a plurality of service categories.

Service categories or services stored in the catalog storage 310 may be stored together with a utilized service capability list for recommendations. A service capability may refer to the ability to use a service, and various elements (e.g., user variables) may be used to identify or define a utilized service capability for recommendation of each service or service category. When the elements (e.g., user variable) satisfies a specific condition disclosed in the utilized service capability list, a match is identified for the service capability for the element, and a specific service or service category may be recommended using a combination of service capabilities for a plurality of elements. In an embodiment, for a security service category, the user variables may include a location of the user, the age group of the user, and/or the current time at the user's location. A utilized service capability list may include further variations, such as a condition that the location of the user is in a high-income region, a condition that the age group of the user ranges from thirties to fifties, and/or a condition that the current time belongs to a night time zone after sunset and before sunrise. Whether service capability is identified for each element may be determined on the basis of whether specific values for each of the element matches or satisfies a threshold for the value. When the value of the variable satisfies the condition in the utilized service capability list, it may be considered that the service is matched and should be pushed for recommendation.

According to certain embodiments, the catalog recommendation device 320 may select a service category or service suitable for recommendation to the user. In order to recommend a service category or service suitable for the user, the catalog recommendation device 320 may collect information and/or an event related to the user and may update the service capability list of the user. In an embodiment, the catalog recommendation device 320 may collect various events that occur through various devices or web services in the IoT cloud 200 of the user illustrated in FIG. 2. In addition, the catalog recommendation device 320 may collect information or an event, such as connection of a new device to the IoT cloud and disconnection of an existing device. The catalog recommendation device 320 may update the service capability list of the user on the basis of the collected information or event.

The service capability list of the user may include one or more data elements that are utilized to determine a service capability of the user (e.g., the types of user information, such as location, age range, etc.) and a user value for each element (i.e., the specific values for each type of information, such as the actual address and actual age of the user). In an embodiment, location information about the user may be an element for defining the service capability, and the service capability list of the user may store current location information about the user corresponding to a user location information element. This information may be updated whenever an event that the current location of the user has changed is received.

The catalog recommendation device 320 may continuously update the service capability list of the user on the basis of user-related information or event collected in real time. In addition, the catalog recommendation device 320 may continuously monitor in real time whether utilization requirements for recommending a specific service category or service, for example, conditions in a utilized service capability list set for the specific service category or service, are satisfied. The monitoring may be performed by comparing a utilized service capability list for each service or service category with the service capability list of the user. When element values in the service capability list of the user satisfy conditions of corresponding elements in the utilized service capability list for the specific service category or service, it may be considered that the utilization requirements for recommending the service category or service are satisfied. In an embodiment, the catalog recommendation device 320 may obtain location information about the user from the terminal device 330 or through a different path, such as a user input. In another embodiment, the catalog recommendation device 320 may obtain the current time through internally managed time information. In still another embodiment, the catalog recommendation device 320 may obtain age information about the user from information input by the user when subscribing to a specific service. On the basis of this obtained information, the catalog recommendation device 320 may update the service capability list of the user to indicate, for example, that the user is currently in a high-income region and is in his/her 30s and the current time zone is a night time zone. The catalog recommendation device 320 may compare the service capability list of the user with the utilized service capability list for a security service described in the above embodiment, and may select the security service as a recommendable service category when the value of an element in the service capability list of the user is included in a condition stored for a corresponding element in the utilized service capability list. Here, the security service can be recommended when the service capability list of the user satisfies conditions for all elements in the utilized service capability list. However, the security service may also be recommended when the service capability list of the user satisfies conditions for some elements rather than all the elements. In an embodiment, a weighting is given to each element in the utilized service capability list, and it may be determined that the conditions are satisfied when the sum of weightings exceeds a certain value. In an embodiment, when the sum of weightings for all the elements in the utilized service capability list is 100 and the sum of weightings for elements satisfying conditions of the utilized service capability list exceeds a certain value (e.g., 80), the security service may be determined as a recommendable service category or service.

The catalog recommendation device 320 may select a plurality of service categories or services when the service capability list of the user satisfies conditions of the utilized service capability list for the plurality of service categories or services.

The catalog recommendation device 320 may notify the terminal device 330 of a specific service category or service for which the service capability list of the user satisfies a condition of the utilized service capability list.

According to certain embodiments, the terminal device 330 may receive the specific service category or service to be recommended from the catalog recommendation device 320 and may generate a catalog to display the service category or service to the user.

The terminal device 330 may display the generated catalog on a screen in various forms. In an embodiment, the terminal device 330 may display each service in a pop-up window. In another embodiment, the terminal device 330 may arrange and display services included in the recommended service category in a list. In this case, various arrangement criteria may be used by the terminal device 330. For example, the terminal device 330 may compare the recommendation grades, suitability, or weightings of the services included in the recommended service category and may arrange the services from higher to lower values in the list. This arrangement method may arrange the services in order in which the user is more likely to use the services. According to an embodiment, the terminal device 330 may arrange the list of the services on the basis of the user's feedback (e.g., 'Like'). According to another embodiment, the terminal device 330 may arrange the list of the services in order of the total configuration cost utilized to implement a service, services suitable for the number of rooms in the user's house, services suitable for the user's house size, services available via a specific object or a combination of objects connected to the user's IoT cloud, or services suitable for a particular time. According to still another embodiment, the terminal device 330 may set a weighting for an object capability utilized by each service and may arrange the services in order of the largest sum of weightings.

Figure 4:
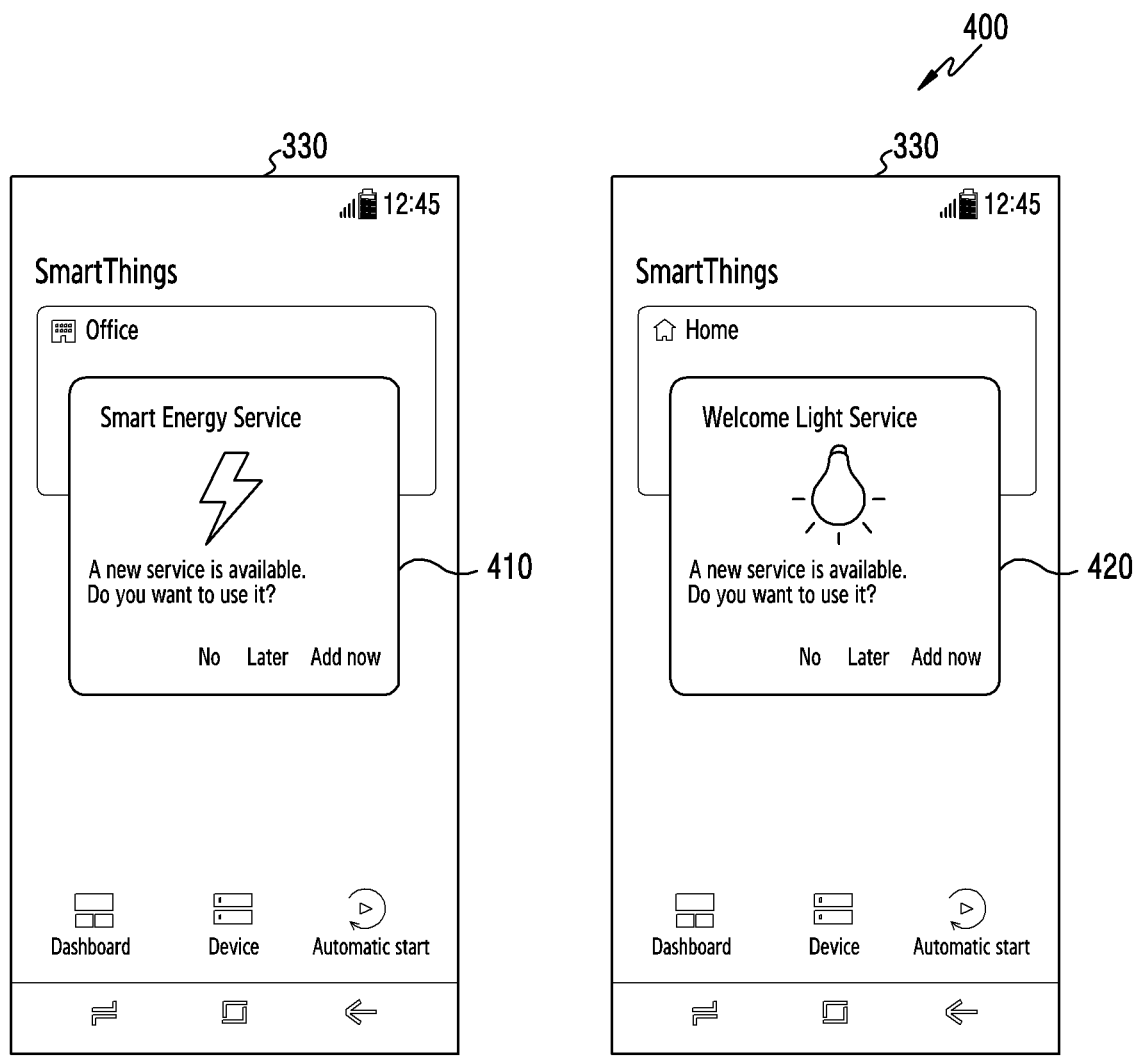
FIG. 4 illustrates an example in which a terminal device displays a catalog showing a recommended service to a user.
Figure 5:
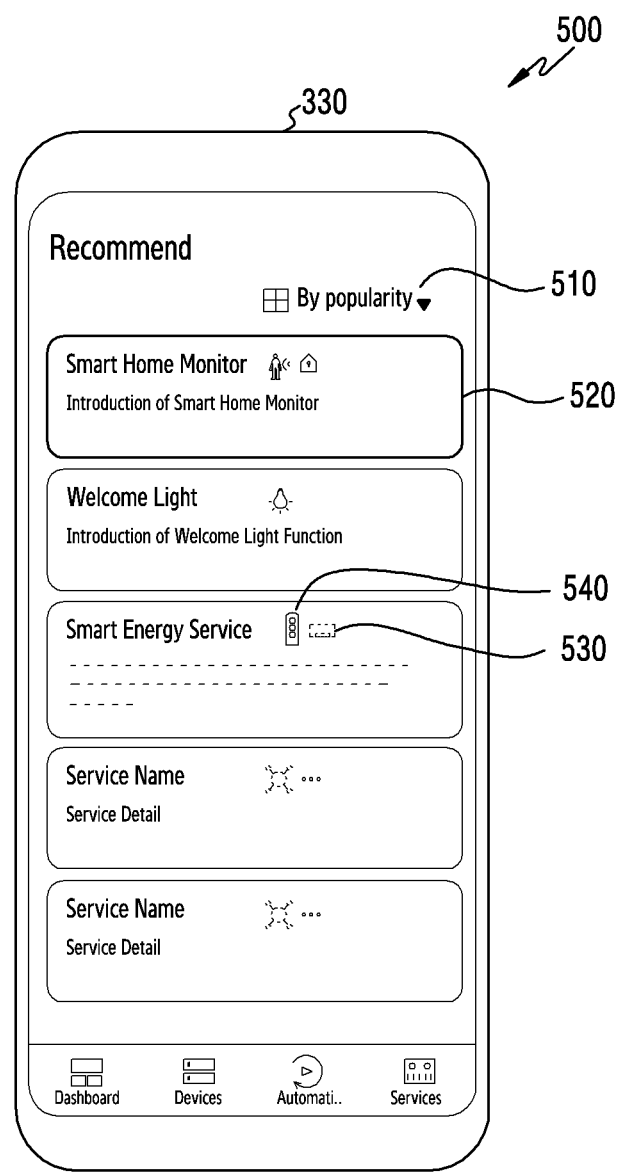
FIG. 5 illustrates an example in which a terminal device displays a catalog showing a recommended service to a user.

FIG. 4 illustrates an example 400 in which the terminal device 330 displays a user interface (UI) guide (e.g., a "catalog") showing a recommended service to a user, and FIG. 5 illustrates an example 500 in which the terminal device 330 displays a UI guide showing a recommended service to a user.

Referring to FIG. 4, when the catalog recommendation device 320 has determined to recommend a specific service, the terminal device 330 may display the service in the form of pop-up window 410 and 420. In an embodiment, when the catalog recommendation device 320 recommends a smart energy service, the terminal device 330 receives the recommended service from the catalog recommendation device 320 and may notify the user that the new recommended service is available, in a pop-up window 410. In another embodiment, the catalog recommendation device 320 may select a "welcome light" service and may transmit the "welcome light" service to the terminal device 330, and the terminal device 330 may notify the user that the transmitted recommended service is available in a pop-up window 420.

Referring to FIG. 5, when the catalog recommendation device 320 recommends a particular category of services, the terminal device 330 may obtain information about all services belonging to the category from the catalog storage 310, generate a visual guide (e.g., a catalog-guide) for display to a user by arranging the obtained services according to a set arrangement method, and display the generated guide on a screen. FIG. 5 illustrates an embodiment in which the obtained services are arranged according to an order of popularity 510.

The terminal device 330 may highlight 520 a specific service when the catalog guide is displayed on the screen. In an embodiment, when the user satisfies both a device capability list needed for the service and a service capability list, for example, when an object or a device needed for the service is connected to the user's IoT cloud (i.e., the device capability requirement), and the user has all service capabilities needed for the service, the service may be highlighted 520 to be distinguished from other services when displayed on the screen. When part of the utilized device capability list needed for the specific service and the service capability list are satisfied and part thereof are not satisfied, icons corresponding to respective device capabilities and/or service capabilities are displayed on the screen such that an unsatisfied capability 530 and a satisfied capability 540 may be distinguished. In an embodiment, the satisfied capability may be displayed in blue, and the unsatisfied capability may be displayed in black. Alternatively, the satisfied capability 540 may be visually represented by a solid line as seen in FIG. 5, and the unsatisfied capability 530 may be displayed in a dotted line as illustrated in FIG. 5. Accordingly, the user can recognize an object, a device, or a service capability that the user needs to additionally have in order to use the specific service.

When the unsatisfied capability 530 and the satisfied capability 540 are displayed in a distinguished manner along with the services, the terminal device 330 may recommend the user to set or purchase an object or a service capability in order to satisfy the unsatisfied capability.

Figure 6:
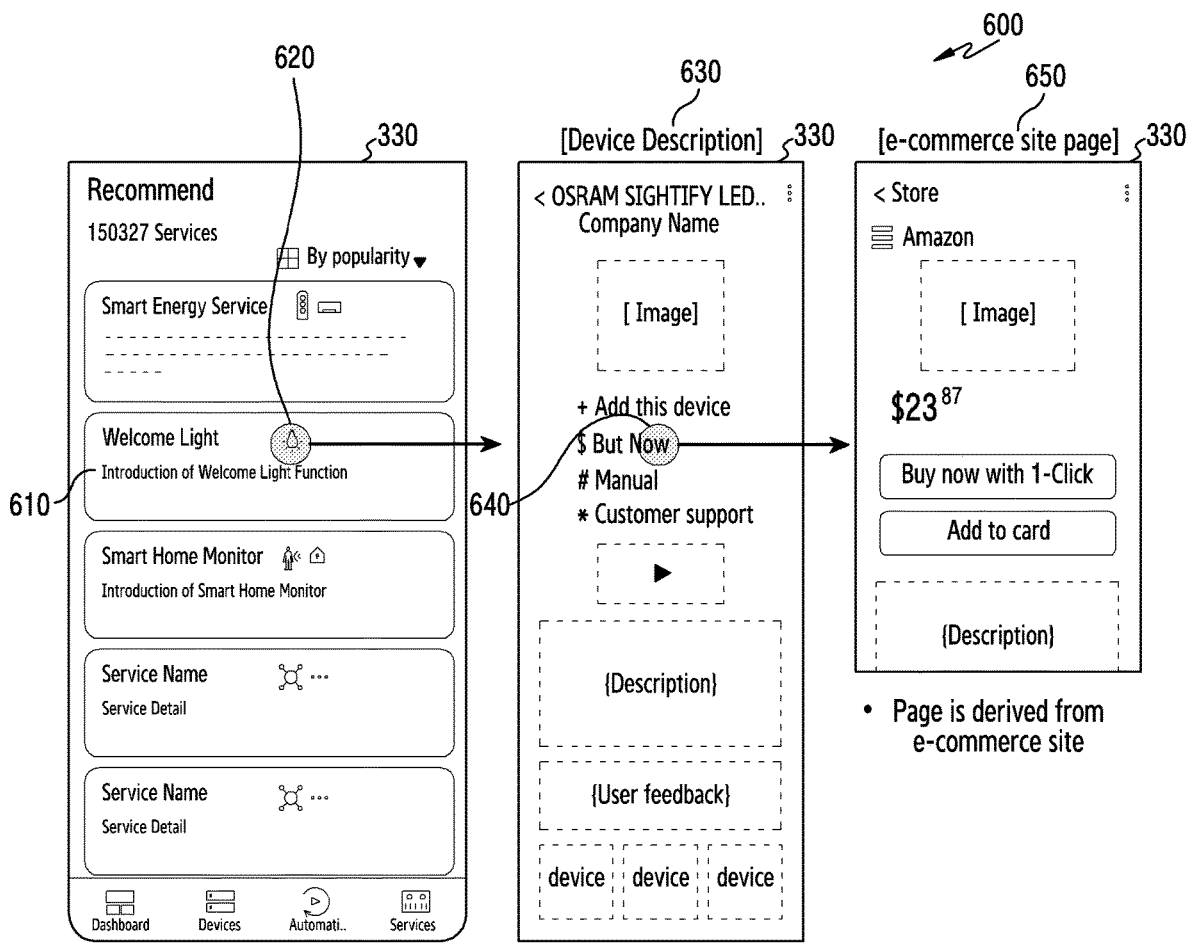
FIG. 6 illustrates an embodiment in which a terminal device recommends a user to purchase a particular object.

FIG. 6 illustrates an embodiment 600 in which the terminal device 330 displays to the user an option to purchase a particular object.

Referring to FIG. 6, in order to use a "welcome light" service 610 (i.e., a service that automatically turns on a smart-light when a user arrives at an entrance of the house, a smart LED lamp (e.g., an automatically controlled LED lamp connected to the user's IoT cloud) may be utilized. However, the smart LED lamp may not yet be included within the user's IoT cloud. Therefore, an icon 620 corresponding to the smart LED lamp may be displayed, along with a service name, and a particular color, in order to indicate that the smart LED lamp function is a presently disabled due to lack of an installed smart LED lamp. When the icon 620 is pressed, a UI guide 630 for purchasing the necessary smart LED lamp may be displayed on a screen of the terminal device 330. Here, the information displayed on the screen of the terminal device 330 may include a hyperlink 640 selectable to navigate to an Internet shopping mall site, where a corresponding smart LED lamp can be purchased. When the hyperlink 640 is selected, navigation may be effected to the internet shopping mall 650 to purchase the smart LED lamp. Alternatively, if the smart LED lamp is already installed but not yet connected, if the icon 620 is pressed, the terminal device 330 may navigate to a website where the object can be configured to be used, instead of the purchase-enabling guide UI 630.

According to certain embodiments, an electronic device (e.g., the electronic device 101 of FIG. 1, the server 108 of FIG. 1, or the electronic device 210 of FIG. 2) may include: a communication module (e.g., the communication module 190) configured to communicate with an external device; at least one processor (e.g., the processor 120) configured to be operatively connected to the communication module; and at least one memory (e.g., the memory 130) configured to be operatively connected to the at least one processor, such that the at least one memory may store instructions to, when executed, enable the at least one processor to: obtain a service category including at least one service and a utilized service capability list needs to recommend the service category; receive a user-related event from the external device through the communication module; update a service capability list of a user on the basis of the user-related event; and select a service category to be recommended by comparing the updated service capability list with the utilized service capability list.

According to certain embodiments, the instructions may enable the at least one processor (e.g., the processor 120) to: obtain a utilized service capability list for each of at least part of the at least one service needed to recommend the at least part of the at least one service; and select a service to be recommended by comparing the updated service capability list with the utilized service capability list for each of the at least part of the service.

According to certain embodiments, the instructions may enable the at least one processor (e.g., the processor 120) to: determine whether values of elements in the updated service capability list entirely satisfy conditions for corresponding elements included in the utilized service capability list; and select the service category to be recommended on the basis of a determination result.

According to certain embodiments, the instructions may enable the at least one processor (e.g., the processor 120) to: determine whether values of elements in the updated service capability list partially satisfy conditions for corresponding elements included in the utilized service capability list; and select the service category to be recommended on the basis of a determination result.

According to certain embodiments, the instructions may enable the at least one processor (e.g., the processor 120) to: set a weighting for each element included in the utilized service capability list; calculate a sum of weightings set for an element in the updated service capability list of which a value satisfies a condition for each corresponding element included in the utilized service capability list; determine whether the sum of the weightings is equal to or greater than a specified value or a specified ratio with respect to a sum of all weightings; and select the service category to be recommended on the basis of a determination result.

According to certain embodiments, the instructions may enable the at least one processor (e.g., the processor 120) to: determine whether values of elements in the updated service capability list entirely satisfy conditions for corresponding elements included in a utilized service capability list for a first service of the at least part of the service; and select the first service as the service to be recommended on the basis of a determination result.

According to certain embodiments, the instructions may enable the at least one processor (e.g., the processor 120) to: further determine whether values of elements in the updated service capability list entirely satisfy conditions for corresponding elements included in a utilized service capability list for a service category including the first service; and select the first service as the service to be recommended on the basis of a determination result.

According to certain embodiments, the instructions may enable the at least one processor (e.g., the processor 120) to: determine whether values of elements in the updated service capability list partially satisfy conditions for corresponding elements included in a utilized service capability list for a first service of the at least part of the service; and select the first service as the service to be recommended on the basis of a determination result.

According to certain embodiments, the instructions may enable the at least one processor (e.g., the processor 120) to: set a weighting for each element included in the utilized service capability list for each of the at least part of the service; calculate a sum of weightings set for an element in the updated service capability list of which a value satisfies a condition for each corresponding element included in the utilized service capability list for each of the at least part of the service; determine whether the sum of the weightings is equal to or greater than a specified value or a specified ratio with respect to a sum of all weightings; and select the service to be recommended on the basis of a determination result.

According to certain embodiments, the electronic device may further include a display device (e.g., the display device 160), such that the instructions may enable the at least one processor (e.g., the processor 120) to: generate a catalog on the basis of the at least one service included in the obtained service category; and display the catalog in a pop-up window or in a list form on the display device.

According to certain embodiments, the instructions may enable the at least one processor (e.g., the processor 120) to generate the catalog by arranging the at least one service included in the obtained service category according to a specified arrangement method.

According to certain embodiments, the instructions may enable the at least one processor (e.g., the processor 120) to: obtain a utilized device capability list needed for each of the at least one service included in the obtained service category; and generate the catalog by comparing the utilized device capability list for each of the at least one service with a device capability list that the user has and arranging the at least one service such that a service for which a larger number of elements in the device capability list that the user has are consistent with those in the utilized device capability list has a priority.

According to certain embodiments, the external device may include a terminal device capable of generating a catalog on the basis of the at least one included service and displaying the catalog to the user, and the instructions may enable the at least one processor (e.g., the processor 120) to transmit information about the selected service category to the terminal device.

According to certain embodiments, the external device may include a category storage configured to store the service category and the utilized service capability list for the service category, and the instructions may enable the at least one processor (e.g., the processor 120) to obtain the service category including the at least one service and the utilized service capability list for recommending the service category from the category storage.

According to certain embodiments, an electronic device (e.g., the electronic device 101 of FIG. 1, the server 108 of FIG. 1, or the electronic device 210 of FIG. 2) may include: a communication module (e.g., the communication module 190) configured to communicate with an external device; a display device (e.g., the display device 160) configured to visually provide information to a user; at least one processor (e.g., the processor 120) configured to be operatively connected to the communication module and the display device; and at least one memory (e.g., the memory 130) configured to be operatively connected to the at least one processor, such that the at least one memory may store instructions to, when executed, enable the at least one processor to: obtain a recommended service category and/or a recommended service using the communication module; obtain information about at least one service belonging to the recommended service category and/or information about the recommended service; generate a catalog on the basis of the information about the at least one service and/or the information about the recommended service; and display the catalog in a pop-up window or in a list form on the display device.

According to certain embodiments, the instructions may enable the at least one processor (e.g., the processor 120) to generate the catalog by arranging the at least one service belonging to the recommended service category according to a specified arrangement method.

According to certain embodiments, the instructions may enable the at least one processor (e.g., the processor 120) to: obtain a utilized device capability list needed for each of the at least one service belonging to the recommended service category; and generate the catalog by comparing the utilized device capability list for each of the at least one service with a device capability list that the user has and arranging the at least one service such that a service for which a larger number of elements in the device capability list that the user has are consistent with those in the utilized device capability list has a priority.

Hereinafter, operations of the foregoing system for displaying a catalog including recommended services to a user will be described.

Figure 7:
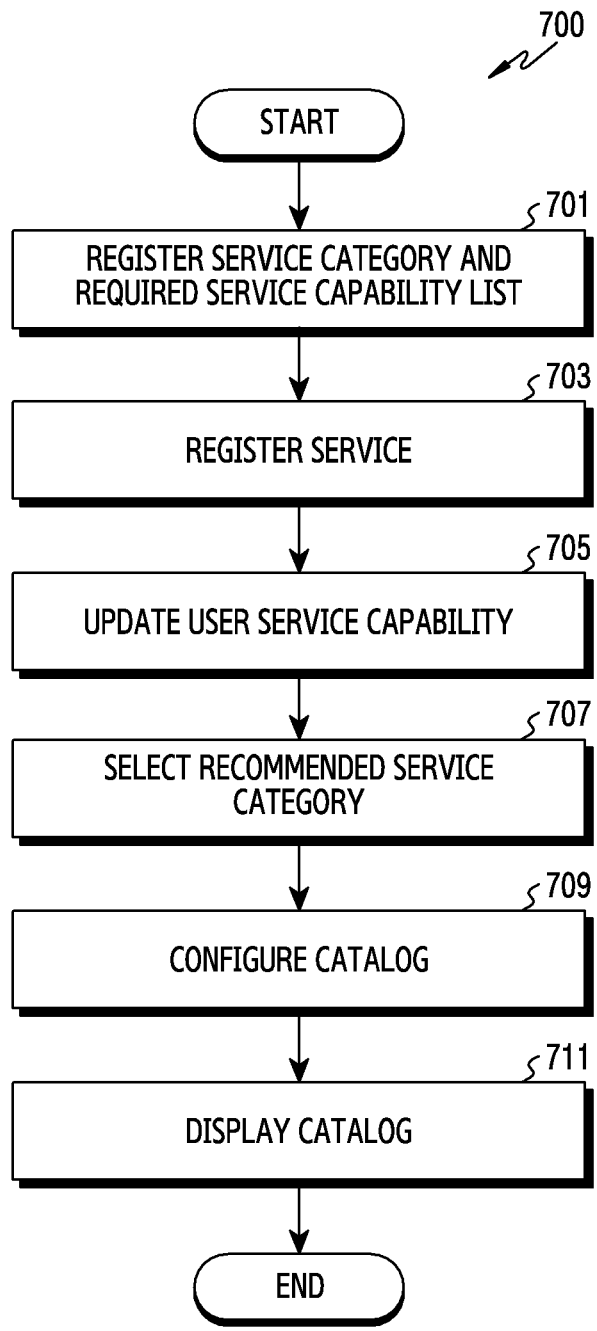
FIG. 7 is a flowchart illustrating an operation of displaying a catalog including a recommended service to a user according to certain embodiments.

FIG. 7 is a flowchart 700 illustrating an operation of displaying a catalog generation process (e.g., generating of a catalog-guide recommending various services to a user), according to certain embodiments. The device executing the operation in the flowchart 700 illustrated in FIG. 7 may be understood as the catalog storage 310, the catalog recommendation device 320, and/or the terminal device 330. According to an embodiment, the catalog storage 310, the catalog recommendation device 320, and/or the terminal device 330 may be implemented together as one device, in a server (e.g., the server 108 of FIG. 1), an electronic device (e.g., the electronic device 101 of FIG. 1), or a PC (e.g., the electronic device 210 of FIG. 2). According to another embodiment, the catalog storage 310, the catalog recommendation device 320, and/or the terminal device 330 may implemented as separate devices among, for example, the server 108 and the electronic device 101 and other requisite devices.

According to certain embodiments, in operation 701, a service category and a utilized service capability list for the service category may be registered in the catalog storage 310. In an embodiment, the catalog storage 310 may generate a service category. Further, the catalog storage 310 may define and store a utilized service capability list for recommending the service category. For example a "security" service category may be stored, with requirements for the "security" service category including specific services, devices utilized to implement those services, types of requisite user data, and lastly specific values or value-ranges for each type of user data. In an embodiment, a service category and a related service capability list may be generated and stored by input from a catalog manager. Alternatively, the catalog recommendation device 320 may store a service category and a related service capability list in the catalog storage 310. A service category and a utilized service capability list associated with each service category stored in the catalog storage 310 may be transmitted to the catalog recommendation device 320 for a subsequent operation.

A service capability may refer to the ability to use a service. Various elements may be used to define a service capability, and the service capability may be regarded as being obtained when each element satisfies a specific condition. Elements used to define a service capability may include the location or place of a user, the number of locations (home, office, favorite place, or the like) associated with the user or the number of rooms in a location, whether the user subscribes to a particular service, a combination of objects or devices the user has, the age of the user, a current time zone, personal information (hobby or interests) agreed by the user, or the user's usage pattern.

According to certain embodiments, in operation 703, the catalog storage 310 may register a service. Various services may be created by the product developers, and the catalog storage 310 may generate and store the developed services. For example, a service may include a smart-camera service or smart-LED lamp service, as implemented by the developer of smart-camera or smart-LED lamp devices. The catalog storage 310 may receive input of information about a generated service and a service category in which the service needs to be included from a developer or an administrator. The catalog storage 310 may store the generated service under a service category in a tree structure or may store the generated service as a service included in the service category.

According to certain embodiments, the catalog storage 310 may define a utilized device capability in association with the generated service. A device capability is an ability obtained by registering an object or a device in a user's IoT cloud, and different kinds of capabilities may be obtained depending on registered objects or devices. In addition, an object or device may have a plurality of device capabilities. According to an embodiment, when a motion sensor capable of detecting a motion is registered, a motion sensor capability may be obtained. When a camera is registered, a video capture device capability may be obtained.

According to certain embodiments, in operation 705, the catalog recommendation device 320 may update a service capability of the user. For example, the catalog recommendation device 320 may receive user-related information, or events generated by various devices and/or services in the IoT cloud relevant to the user, and may update a service capability list of the user in real time on the basis of the collected information and/or events. For example, the catalog recommendation service 320 may receive user information, such as an address, an age range, a time of day, and other information generated by smart-devices located in the user's home.

According to certain embodiments, in operation 707, the catalog recommendation device 320 may select a recommended service category by comparing the service capability list of the user with the utilized service capability list of the service category stored in the catalog storage 310. For example, based on the received user information, the catalog recommendation device 320 may determine that "security" is a matching category of services to recommend to the user. This may be determined by matching the devices, data types of user information, etc. match the "security" category, based on pre-stored requirements for recommending the "security" category. According to an embodiment, the catalog recommendation device 320 may determine whether the values of elements in the service capability list of the user satisfy conditions of corresponding elements included in a utilized service capability list for a specific service category. The catalog recommendation device 320 may select a specific service category that satisfies all elements included in the utilized service capability list as a recommended service category. According to another embodiment, the catalog recommendation device 320 may select a specific service category satisfying conditions of some elements of the service category as a recommended service category. For example, the catalog recommendation device 320 may assign a weighting to each element included in the utilized service capability list and may select a service category satisfying the sum of weightings that is equal to or greater than a certain value or a certain ratio as a recommended service category. According to still another embodiment, the catalog recommendation device 320 may recommend a service rather than a service category. The catalog recommendation device 320 may store a utilized service capability list corresponding to a service. The catalog recommendation device 320 may select a specific service as a recommended service when conditions for all or some elements included in a utilized service capability list for the specific service are satisfied.

According to certain embodiments, the terminal device 330 may receive the selected service category from the catalog recommendation device 320 and may configure or generate a catalog-guide in step 709. According to an embodiment, the terminal device 330 may retrieve information about one or more services included in the received service category from the catalog storage 310, and may arrange the retrieved services in a UI format, to generate a visual catalog-guide to be displayed to the user. The terminal device 330 may use various arrangement criteria. For example, the terminal device 330 may compare the recommendation grades, suitability of the services, or weightings of the services included in the recommended service category and may arrange the services from highest to lowest values in the list. This arrangement method may arrange the services in order in which the user is more likely to use the services. According to an embodiment, the terminal device 330 may preferentially arrange a service on the basis of the user's feedback (e.g., 'Like'). According to another embodiment, the terminal device 330 may arrange the services on the basis of the total configuration cost utilized to implement a service. According to still another embodiment, the terminal device 330 may preferentially arrange a service suitable for the number of rooms in the user's house on the top or may preferentially arrange a service suitable for the user's house size. According to yet another embodiment, the terminal device 330 may arrange the services in order of services available via a specific object or a combination of objects connected to the user's IoT cloud or services suitable for a particular time. According to still another embodiment, the terminal device 330 may set a weighting for an object capability utilized by each service and may arrange the list of the services in order of the largest sum of weightings.

According to certain embodiments, the terminal device 330 may receive a selected service instead of a service category. When receiving the selected service, the terminal device 330 may generate a catalog including information about the received service.

According to certain embodiments, in operation 711, the terminal device 330 may display the generated catalog on a screen to be shown to the user. According to an embodiment, the terminal device 330 may display each service in pop-up windows 410 and 420 as illustrated in FIG. 4. When the selected service is received and thus the catalog includes the information about the service, the terminal device 330 may display the information about the service in the pop-up windows 410 and 420. When the service category includes one service, the terminal device 330 may also display information about the service in the pop-up windows 410 and 420. When the service category includes a plurality of services, the terminal device 330 may determine priorities of the services by arrangement and may also display a highest-priority service in the pop-up windows 410 and 420. In addition, the terminal device 330 may sequentially display information about a service in the pop-up windows 410 and 420 according to the arrangement order.

According to another embodiment, the terminal device 330 may display services in a list to the user as illustrated in FIG. 5. The terminal device 330 may display a plurality of services arranged according to the generated priority and included in a catalog on the screen such that a service having a higher priority is displayed first.

According to the foregoing methods, the user can view a catalog including a service list suitable for the user.

Figure 8:
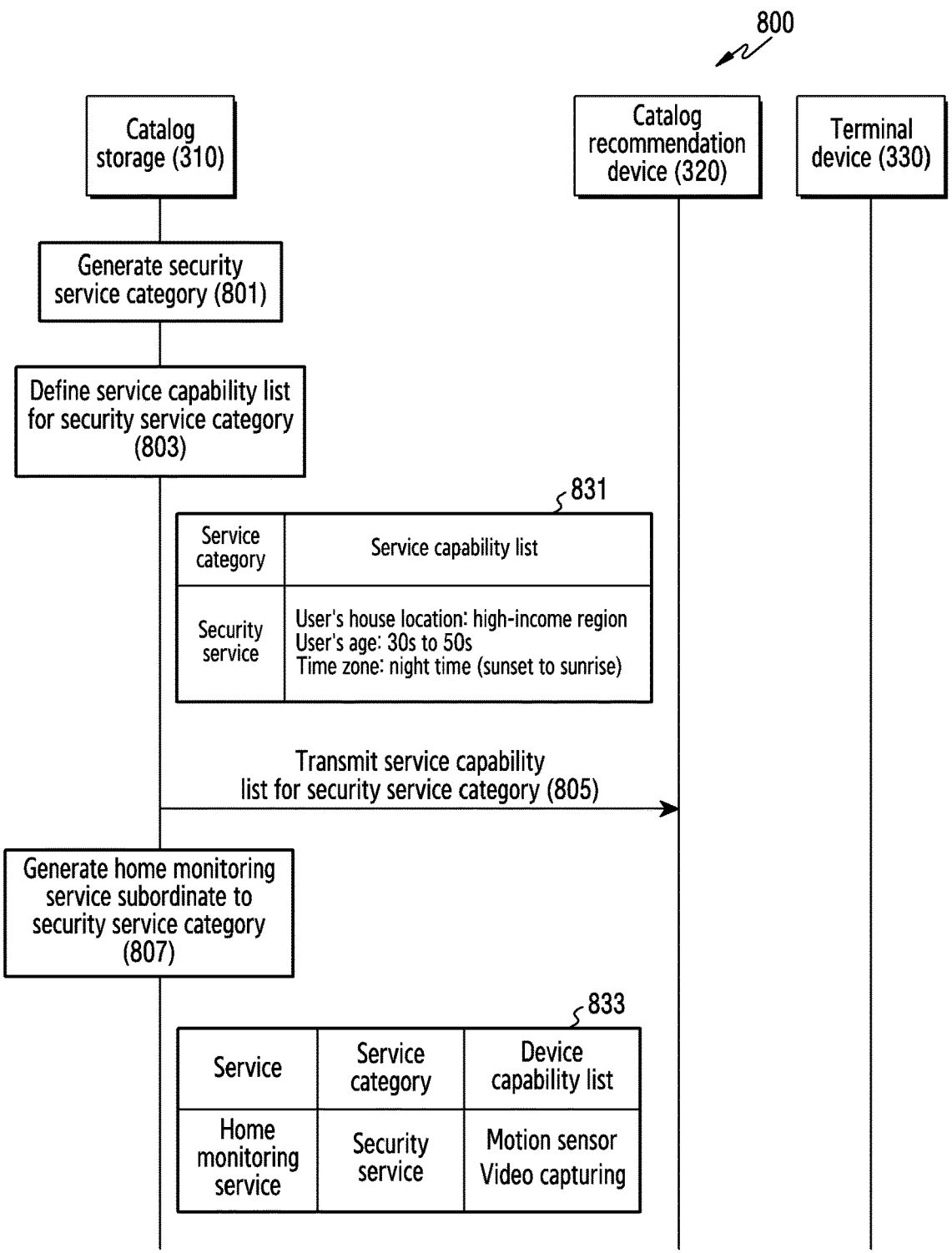
FIG. 8 is a flowchart illustrating an operation of registering a service according to certain embodiments.

FIG. 8 is a flowchart 800 illustrating an operation of registering a service according to certain embodiments. The flowchart 800 of FIG. 8 illustrates an embodiment of operations 701 and 703 of FIG. 7, in which the subject of the operation may be understood as a catalog storage (e.g., the catalog storage 310 of FIG. 3).

Referring to FIG. 8, in operation 801, the catalog storage 310 generate a "security" service category. In operation 803, the catalog storage 310 may define a utilized service capability list 831 for the security service category. In an embodiment, elements used in defining the utilized service capability list may include the location of the user's house, the age of the user, and/or a time zone, and conditions for obtaining a service capability may include a condition that the location of the user's house is in a high-income region, a condition that the age of the user ranges from thirties to fifties, and/or a present time of day zone (e.g., day time or night time). The utilized service capability list for the service category may be stored in a database form in a memory of the catalog storage 310.

According to certain embodiments, in operation 805, the catalog storage 310 may transmit the utilized service capability list for the security service category to the catalog recommendation device 320. The catalog recommendation device 320 may store the received utilized service capability list for the service category in a database form in the memory for future use. According to another embodiment, the catalog recommendation device 320 may read (e.g., analyze) the generated utilized service capability list for the security service category from the catalog storage 310 and may use the same. In this case, the catalog recommendation device 320 may obtain the service category and the related utilized service capability list from the catalog storage 310 when particular instead of storing the same.

According to certain embodiments, in operation 807, the catalog storage 310 may generate a home monitoring service subordinate to the security service category. Based on a variety of computer-solutions, such as by pre-association between conditions, sets of conditions and product services, or based on machine-learning artificial intelligence, the conditions may then be used to define the services or products relevant to providing security for the user's input information. Here, the catalog storage 310 may also store a utilized device capability list 833 in relation thereto. According to an embodiment of FIG. 8, a motion sensor and video capturing may be configured in a utilized device capability list for the home monitoring service.

Figure 9:
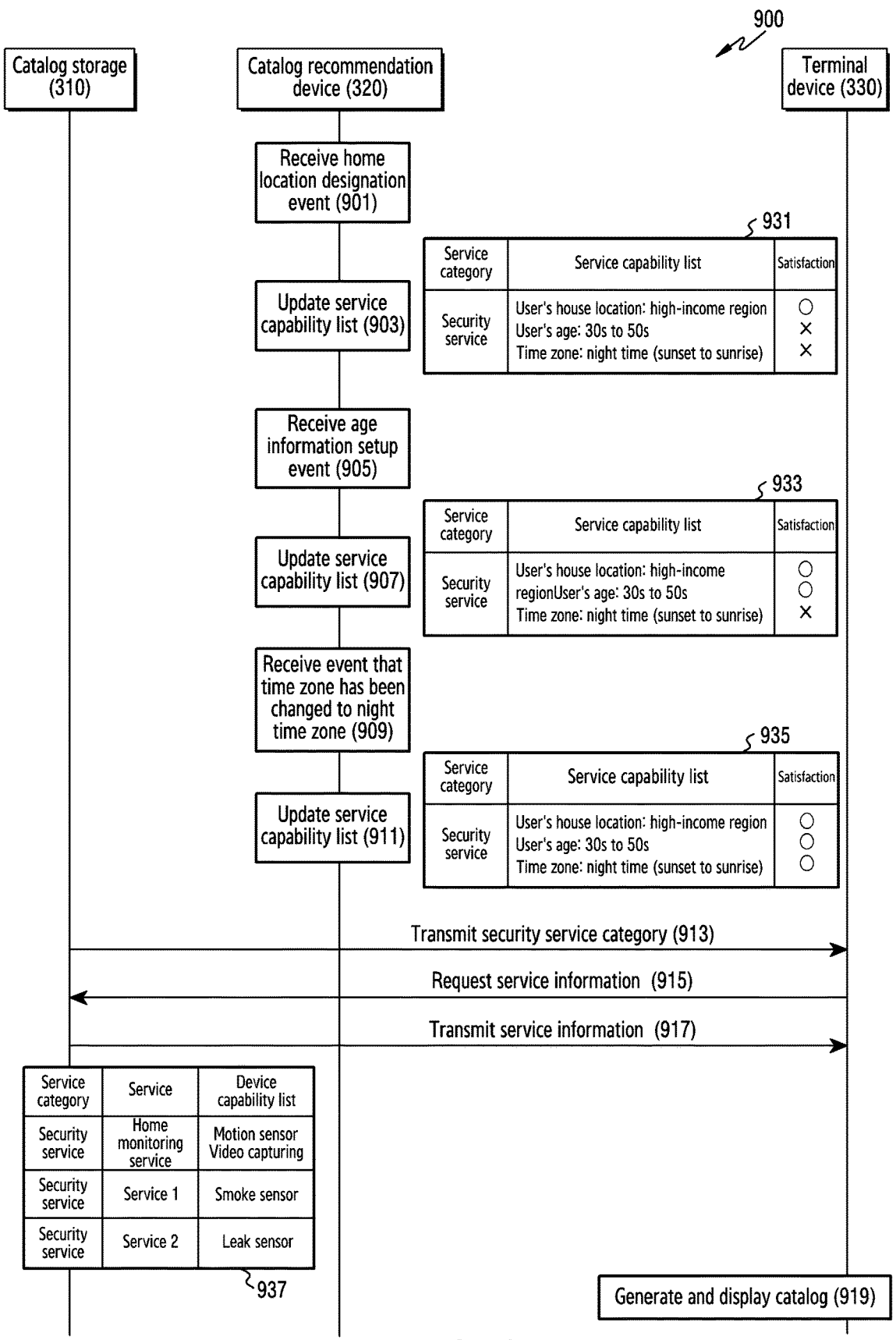
FIG. 9 is a flowchart illustrating an operation of recommending a service category suitable for a user according to certain embodiments.

FIG. 9 is a flowchart 900 illustrating an operation of recommending a service category suitable for a user according to certain embodiments. The flowchart 900 of FIG. 9 illustrates an embodiment of operations 705 to 711 of FIG. 7, in which the subject of the operation may be understood as a catalog recommendation device (e.g., the catalog recommendation device 320 of FIG. 3) and/or a terminal device (e.g., the terminal device 330 of FIG. 3).

According to certain embodiments, the catalog recommendation device 320 may update a service capability list whenever a user-related event occurs. In operation 901, the catalog recommendation device 320 may receive a home location designation event of the user from the IoT cloud. In operation 903, the catalog recommendation device 320 may update a service capability list of the user on the basis of the received event. Based on a pre-association between user variables, service capabilities, devices, services, etc., the catalog recommendation device 320 may compare a utilized service capability list for each service category with the service capability list of the user, thereby identifying whether the utilized service capability list is satisfied. The catalog recommendation device 320 may store the utilized service capability list for each service category and information about whether the utilized service capability list is satisfied 931 in a database form in the memory.

According to certain embodiments, in operation 905, the catalog recommendation device 320 may receive an event that age information has been set by the user's input or via the user's account in order to subscribe to a new service.

In operation 907, the catalog recommendation device 320 may update a corresponding service capability list of the user. The catalog recommendation device 320 may compare an updated element with the utilized service capability list for each service category, thus identifying whether the updated element satisfies the utilized service capability list for each service category. The catalog recommendation device 320 may store the utilized service capability list for each service category and updated information about whether the utilized service capability list is satisfied 933 in a database form in the memory.

According to certain embodiments, in operation 909, the catalog recommendation device 320 may receive or generate an event that a time zone has been changed to a night time zone on the basis of time information received from a server providing time information or autonomously managed time information.

In operation 911, the catalog recommendation device 320 may update a corresponding service capability list 935 of the user. The catalog recommendation device 320 may compare an updated element with the utilized service capability list for each service category, thus identifying whether the updated element satisfies the utilized service capability list for each service category. According to an embodiment, the catalog recommendation device 320 may store the utilized service capability list for each service category and updated information about whether the utilized service capability list is satisfied 933 in a database form in the memory.

According to certain embodiments, the catalog recommendation device 320 may update the service capability list of the user and may determine whether each element of the utilized service capability list for the service category is satisfied according to the foregoing operations.

According to certain embodiments, in operation 913, the catalog recommendation device 320 may transmit information about a service category satisfying conditions of all elements of the utilized service capability list to the terminal device 330. According to an embodiment, the catalog recommendation device 320 may transmit information about the security service category to the terminal device 330.

In operation 915, the terminal device 330 may request, from the catalog storage 310, information about a service included in the service category received from the catalog recommendation device 320. In operation 917, the terminal device 330 may receive information 937 about a service included in the service category from the catalog storage 310. According to an embodiment of FIG. 9, the terminal device 330 may request information about a service included in the security service category from the catalog storage 310 and may receive a home monitoring service, service 1, and service 2, which are included in the security service category, from the catalog storage 310. According to an embodiment, the terminal device 330 may receive a utilized device capability list utilized by each service from the catalog storage 310 via the information about the service.

In operation 919, the terminal device 330 may generate a catalog on the basis of the information about the service received from the catalog storage 310, and may display the catalog on the screen to be shown to the user.

Figure 10:
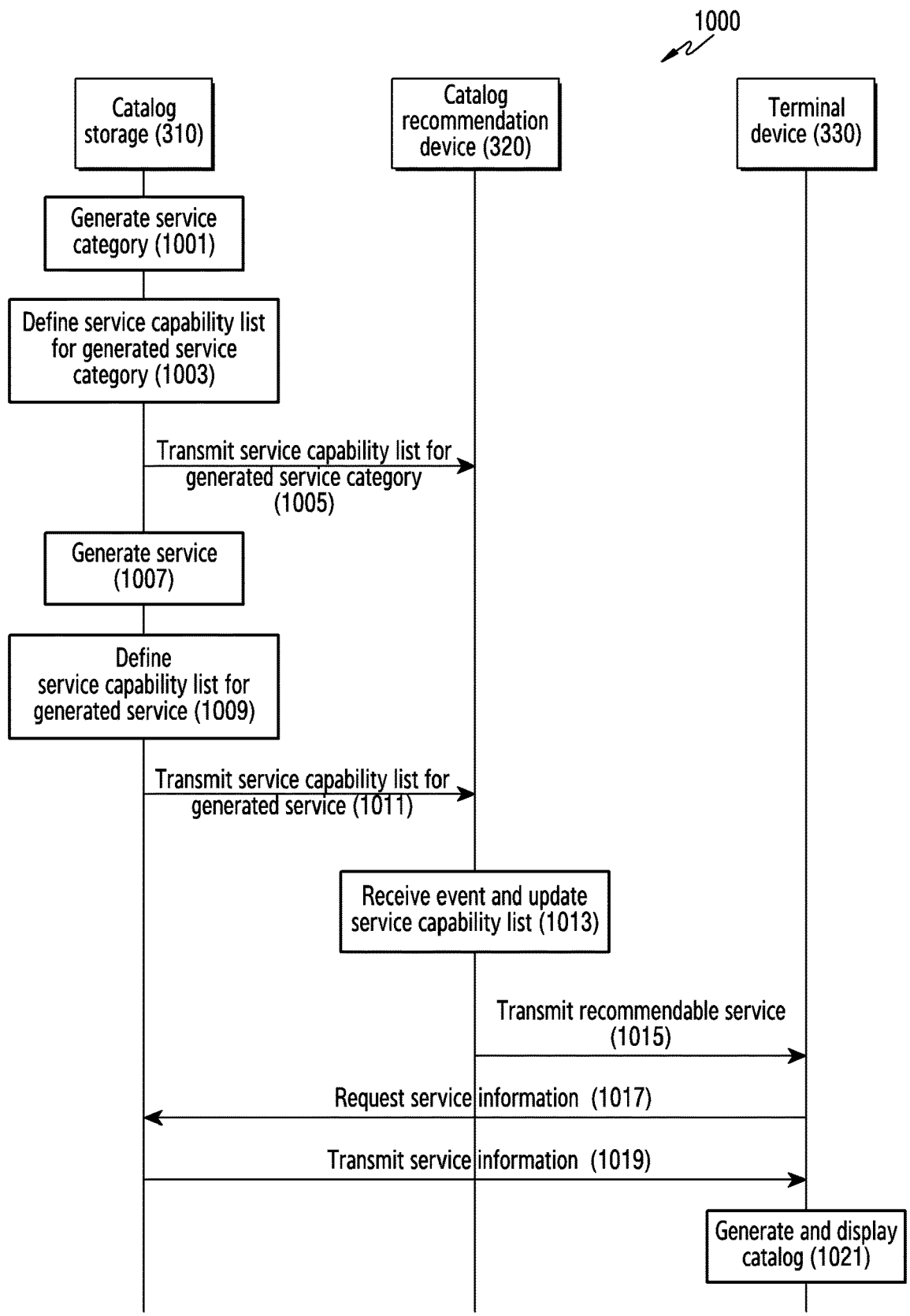
FIG. 10 is a flowchart illustrating an operation of recommending a service suitable for a user according to certain embodiments.

FIG. 10 is a flowchart 1000 illustrating an operation of recommending a service suitable for a user according to certain embodiments. The subject of the operation in the flowchart 1000 illustrated in FIG. 10 may be understood as a catalog storage (e.g., the catalog storage 310 of FIG. 3), a catalog recommendation device (e.g., the catalog recommendation device 320 of FIG. 3), and/or a terminal device (e.g., the terminal device 330 of FIG. 3).

According to certain embodiments, to autonomously recommend a service rather than a service category, the catalog storage 310 may define a utilized service capability list for a service. In operation 1001, the catalog storage 310 may generate a service category. In operation 1003, the catalog storage 310 may define and store a utilized service capability list for the generated service category. In operation 1005, the catalog storage 310 may transmit the generated service category and the related utilized service capability list to the catalog recommendation device 320.

According to certain embodiments, in operation 1007, the catalog storage 310 may generate a service. The generated service may be registered subordinate to the already generated service category. In operation 1009, the catalog storage 310 may define a utilized service capability list for the service in order to autonomously recommend the service. In operation 1011, the catalog storage 310 may transmit the generated service and the related utilized service capability list to the catalog recommendation device 320.

According to certain embodiments, in operation 1013, the catalog recommendation device 320 may receive a user-related event and may update a service capability list. For example, the catalog recommendation device 320 may update the service capability list of the user whenever a user-related event occurs.

According to certain embodiments, the catalog recommendation device 320 may select a specific service as a recommendable service when the service satisfies conditions of all elements included in a utilized service capability list autonomously for the specific service. According to an embodiment, in operation 1015, the catalog recommendation device 320 may transmit the selected service to the terminal device 330.

According to certain embodiments, in operation 1017, the terminal device 330 may request information about the service from the catalog storage 310.

In operation 1019, the terminal device 330 may receive the information about the service from the catalog storage 310.

In operation 1021, the terminal device 330 may generate and display a catalog using the information about the service. According to an embodiment, the terminal device 330 may display a service to be recommended in a pop-up window.

Figure 11:
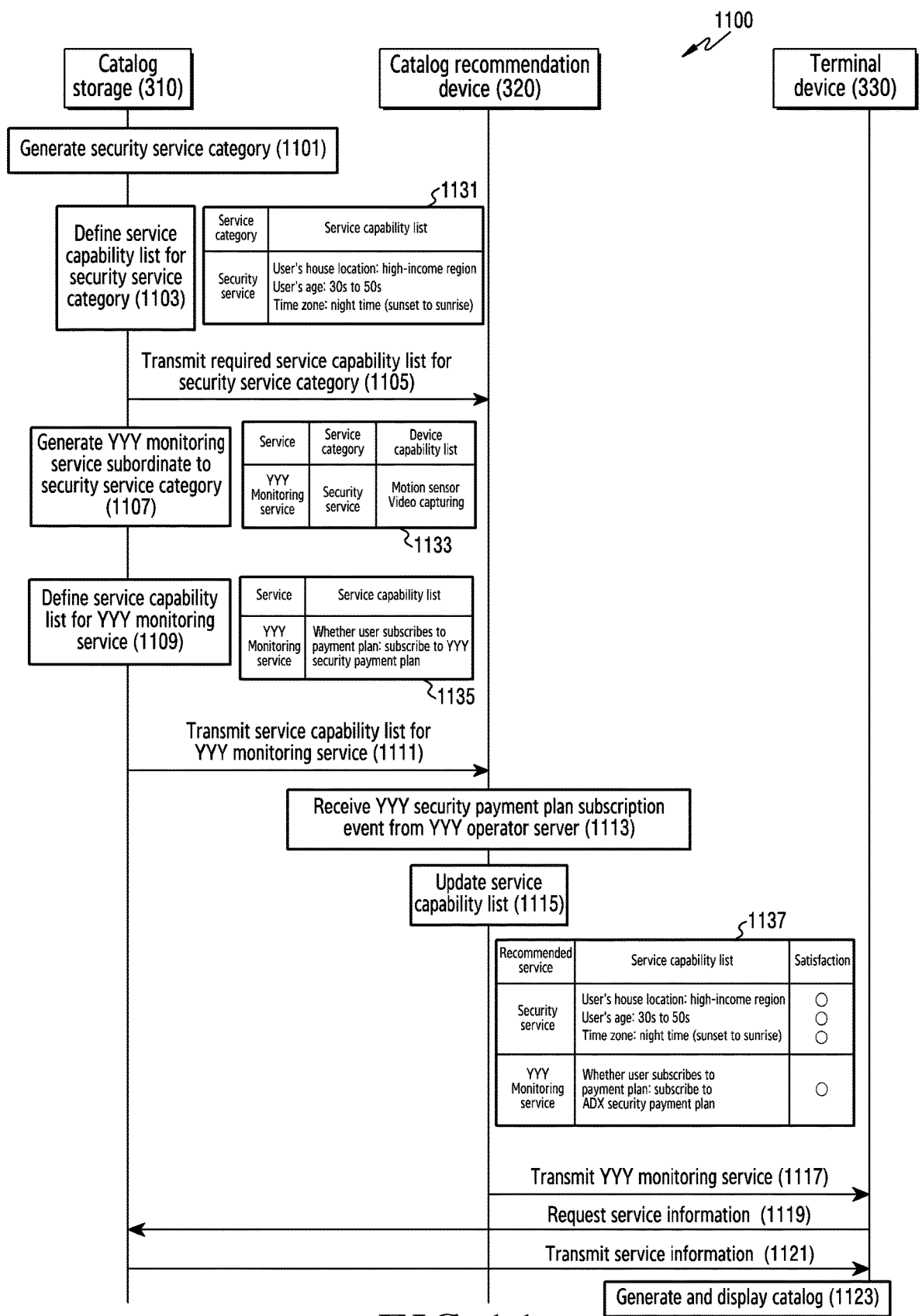
FIG. 11 is a flowchart illustrating one example of an operation of recommending a service suitable for a user according to certain embodiments.

FIG. 11 is a flowchart 1100 illustrating one example of an operation of recommending a service suitable for a user according to certain embodiments. The subject of the operation in the flowchart 1100 illustrated in FIG. 11 may be understood as a catalog storage (e.g., the catalog storage 310 of FIG. 3), a catalog recommendation device (e.g., the catalog recommendation device 320 of FIG. 3), and/or a terminal device (e.g., the terminal device 330 of FIG. 3).

According to certain embodiments, in operation 1101, the catalog storage 310 generate a security service category.

In operation 1103, the catalog storage 310 may define and store a utilized service capability list 1131 for the security service category. For example, for the security service category, the utilized service capability list 1131 stored in the catalog storage 310 may include the location of the user's house, the age of the user, and/or a time zone.

In operation 1105, the catalog storage 310 may transmit the generated security service category and the related utilized service capability list to the catalog recommendation device 320.

According to certain embodiments, in operation 1107, the catalog storage 310 may generate a YYY monitoring service subordinate to the security service category. For example, the catalog storage 310 may define a utilized device capability list 1133 for the YYY monitoring service. In one example, for the YYY monitoring service, the utilized device capability list 1133 defined by the catalog storage 310 may include a motion sensor and/or video capturing.

According to certain embodiments, in operation 1109, the catalog storage 310 may define a utilized service capability list 1135 for the service in order to autonomously recommend the service. In an embodiment of FIG. 11, the YYY monitoring service is a monitoring service provided by a YYY company, which is available when subscribing to a YYY security payment plan. Accordingly, an element in the utilized service capability list 1135 for the YYY monitoring service may be whether the user subscribes to a payment plan, and a condition may be whether the user subscribes to the YYY security payment plan.

In operation 1111, the catalog storage 310 may transmit the generated YYY monitoring service and the related utilized service capability list to the catalog recommendation device 320.

According to certain embodiments, in operation 1113, the catalog recommendation device 320 may receive an event that the user has subscribed to the YYY security payment plan from a YYY operator server.

In operation 1115, the catalog recommendation device 320 may update a service capability list of the user. For example, the catalog recommendation device 320 may recognize that the utilized service capability list for the YYY monitoring service is satisfied and may select the YYY monitoring service as a recommended service.

According to certain embodiments, when a utilized service capability list for a service category including a specific service is satisfied and a utilized service capability list for the specific service is also satisfied, the catalog recommendation device 320 may select the specific service as a recommended service and may transmit the specific service to the terminal device 330. According to an embodiment of FIG. 11, when not only the utilized service capability list for the security service category is satisfied but the utilized service capability list for the YYY monitoring service is also utilized (1137), the catalog recommendation device 320 may select the YYY monitoring service as a recommended service.

In operation 1117, the catalog recommendation device 320 may transmit the YYY monitoring service to the terminal device 330.

According to certain embodiments, in operation 1119, the terminal device 330 may request information about the service from the catalog storage 310.

In operation 1121, the terminal device 330 may receive the information about the service from the catalog storage 310.

In operation 1123, the terminal device 330 may generate a catalog and may display the service recommended to the user. For example, the terminal device 330 may generate a catalog using the information about the service and may display the service recommended to the user without arrangement on the basis of suitability determination.

According to an embodiment, even though the utilized service capability list for the service category including the specific service is not satisfied, when the utilized service capability list for the specific service is satisfied, the catalog recommendation device 320 may select the specific service as a recommended service.

Figure 12A:
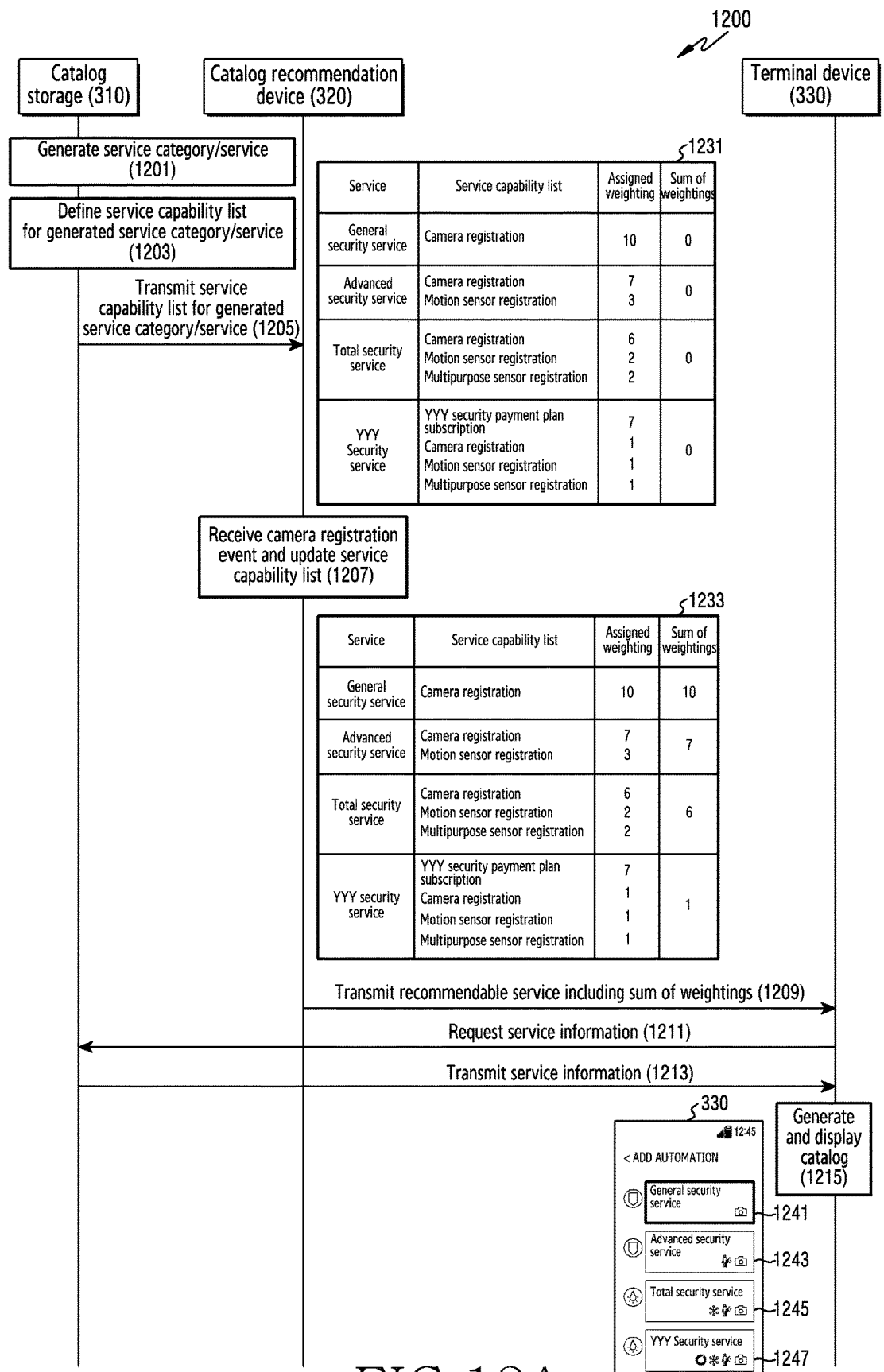
FIG. 12A is a flowchart illustrating an operation of recommending a service suitable for a user using a weighting according to certain embodiments.
Figure 12B:
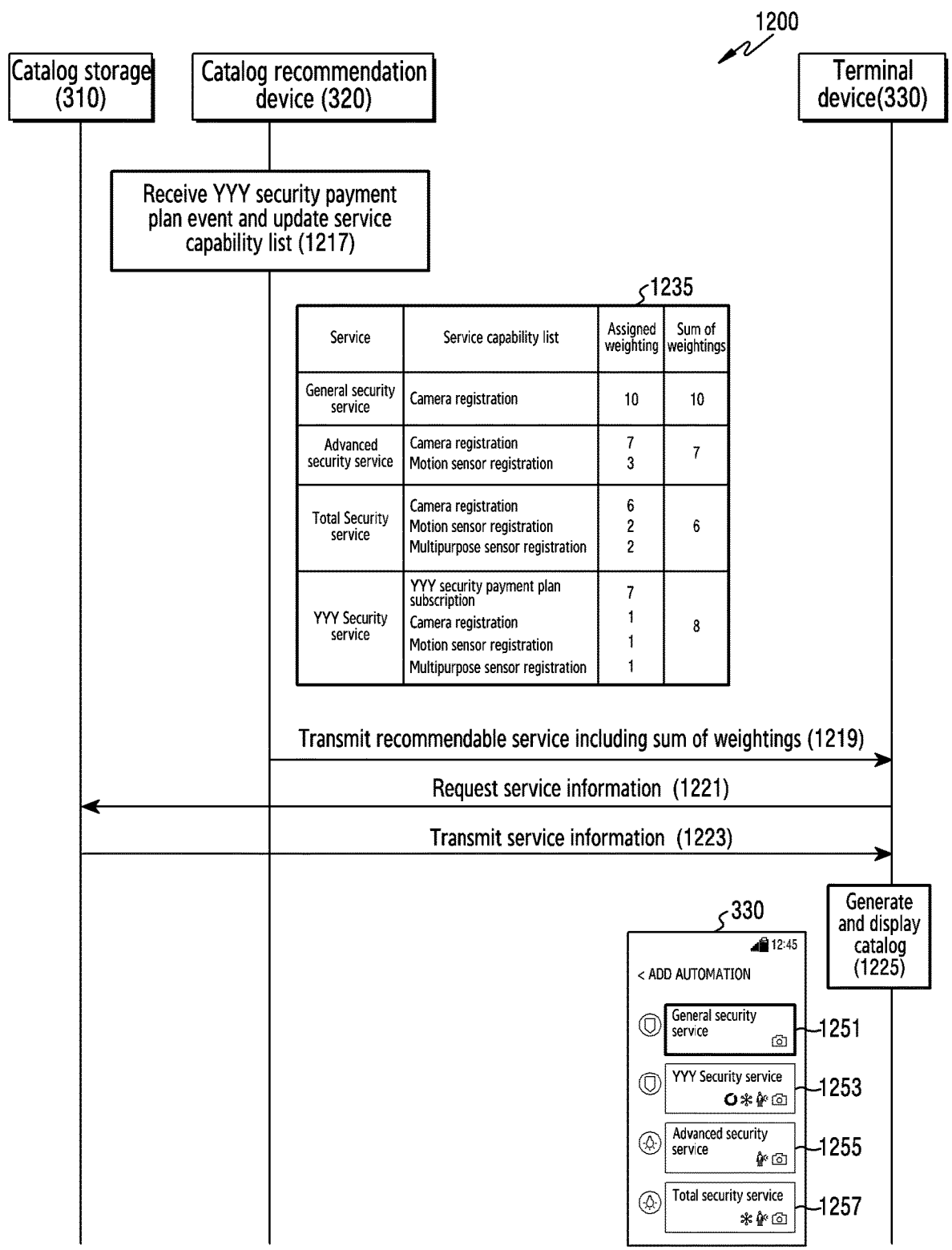
FIG. 12B is a flowchart illustrating an operation of recommending a service suitable for a user using a weighting according to certain embodiments.

FIG. 12A is a flowchart 1200 illustrating an operation of recommending a service suitable for a user using a weighting according to certain embodiments, and FIG. 12B is a flowchart 1200 illustrating an operation of recommending a service suitable for a user using a weighting according to certain embodiments. The subject of the operation in the flowchart 1200 illustrated in FIG. 12A and FIG. 12B may be understood as a catalog storage (e.g., the catalog storage 310 of FIG. 3), a catalog recommendation device (e.g., the catalog recommendation device 320 of FIG. 3), and/or a terminal device (e.g., the terminal device 330 of FIG. 3).

According to certain embodiments, in operation 1201, the catalog storage 310 may generate a service category and/or a service. The catalog storage 310 may first generate a service category and may generate a service included in the generated service category.

In operation 1203, the catalog storage 310 may define and store utilized service capability lists for the generated service category and/or the generated service.

In operation 1205, the catalog storage 310 may transmit the generated service category and/or the generated service, and the related utilized service capability lists to the catalog recommendation device 320. According to an embodiment, the catalog storage 310 may also transmit a weighting assigned to each element included in each of the utilized service capability lists for the service category and/or the service. According to an embodiment, the catalog recommendation device 320 may assign a weighting to each element included in each of the utilized service capability lists for the service category and/or the service on the basis of the service category and/or the service, and the related utilized service capability lists. Accordingly, the catalog recommendation device 320 may store the service, the utilized service capability list, the assigned weighting, and the sum of weightings in combination (e.g., 1231 of FIG. 12A) in a database form in the memory.

According to certain embodiments, in operation 1207, the catalog recommendation device 320 may receive a camera registration event from the IoT cloud and may update a service capability list of the user. The catalog recommendation device 320 may calculate the sum of weightings by comparing the service capability list of the user with a utilized service capability list for each service. For example, referring to a table (e.g., 1233) of FIG. 12A, the catalog recommendation device 320 may update the sum of weightings for a general security service to 10, the sum of weightings for an advanced security service to 7, the sum of weightings for a total security service to 6, and the sum of weightings for a YYY security service to 1.

According to certain embodiments, in operation 1209, the catalog recommendation device 320 may transmit recommendable services including the sum of weightings for each service to the terminal device 330.

According to certain embodiments, in operation 1211, the terminal device 330 may request information about the services from the catalog storage 310.

In operation 1213, the terminal device 330 may receive the information about the services from the catalog storage 310.

In operation 1215, the terminal device 330 may generate a catalog and may display a service to be recommended to the user. For example, the terminal device 330 may generate a catalog such that a service having a higher sum of weightings is displayed at an upper position on the basis of the sum of weightings received together with the recommended service from the catalog recommendation device 320 and may display the generated catalog to the user. In an embodiment of FIG. 12A, the general security service having the highest sum of weightings may be displayed at the top (1241), the advanced security service having the second highest sum of weightings may be displayed next (1243), and the remaining services may be displayed in order from higher to lower sums of weightings such that the total security service may be displayed next (1245) and the YYY security service may be displayed at the bottom (1247).

According to certain embodiments, in operation 1217, the catalog recommendation device 320 may receive an event that the user has subscribed to a YYY security payment plan from a YYY operator server and may update the service capability list of the user. The catalog recommendation device 320 may recalculate the sum of weightings by comparing the service capability list of the user with the utilized service capability list for each service. For example, referring to a table (e.g., 1235) of FIG. 12B, the catalog recommendation device 320 may maintain the sum of weightings for the general security service that is 10, the sum of weightings for the advanced security service that is 7, the sum of weightings for the total security service that is 6 and may update the sum of weightings for the YYY security service to 8.

According to certain embodiments, in operation 1219, the catalog recommendation device 320 may transmit recommendable services including the updated sum of weightings for each service to the terminal device 330.

According to certain embodiments, in operation 1221, the terminal device 330 may request information about the services from the catalog storage 310. In operation 1223, the terminal device 330 may receive the information about the services from the catalog storage 310. When the terminal device 330 already has information about a previous service in an embodiment of FIG. 12B, operations 1221 and 1223 may be omitted.

According to certain embodiments, in operation 1225, the terminal device 330 may generate a catalog and may display a service to be recommended to the user. For example, the terminal device 330 may regenerate a catalog such that a service having a higher sum of weightings is displayed at an upper position on the basis of the updated sum of weightings received together with the recommended service from the catalog recommendation device 320 and may display the generated catalog to the user. In an embodiment of FIG. 12B, the general security service having the highest sum of weightings may be displayed at the top (1251), the YYY security service having the second highest sum of weightings may be displayed next (1253), and the remaining services may be displayed in order from higher to lower sums of weightings such that the advanced security service may be displayed next (1255) and the total security service may be displayed at the bottom (1257).

As described above, the catalog storage 310, the catalog recommendation device 320, and/or the terminal device 330 are systemically described as being illustrated as separate devices but are not limited to this configuration. Instead, the catalog storage 310, the catalog recommendation device 320 and the terminal device 330 may be configured together to operate in the electronic device 101 of FIG. 1, the server 108 of FIG. 1, or the electronic device 210 of FIG. 2. According to an embodiment, the catalog storage 310 and the catalog recommendation device 320 may be configured in one server. According to another embodiment, the catalog recommendation device 320 and the terminal device 330 may be configured in one device.

While the above description has been made with reference to the overall operation the catalog storage 310, the catalog recommendation device 320, and/or the terminal device 330, the following description focuses on the operation of one device.

Figure 13:
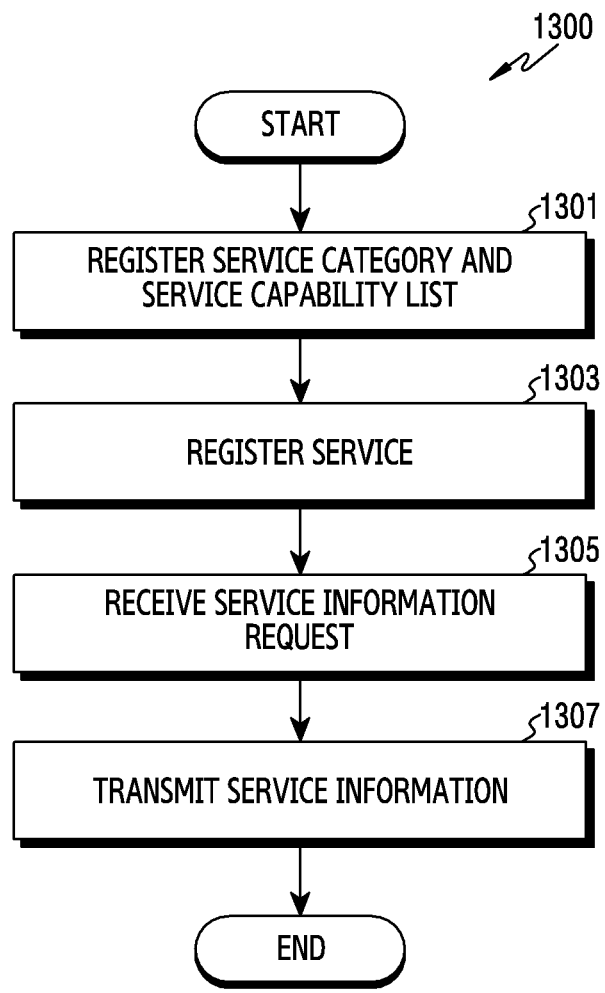
FIG. 13 is a flowchart illustrating an operation of a category storage for recommending a service category suitable for a user according to certain embodiments.

FIG. 13 is a flowchart 1300 illustrating an operation of a catalog storage 310 for recommending a service category suitable for a user according to certain embodiments. The subject of the operation in the flowchart 1300 illustrated in FIG. 13 may be understood as a catalog storage (e.g., the catalog storage 310 of FIG. 3), and the catalog storage 310 of FIG. 3 may be configured in a server (e.g., the server 108 of FIG. 1) or an electronic device (e.g., the electronic device 101 of FIG. 1 or the electronic device 210 of FIG. 2).

According to certain embodiments, in operation 1301, the catalog storage 310 may register a service category and may define a utilized service capability list utilized to recommend the service category. The service category registered in the catalog storage 310 and the utilized service capability list for the service category may be transmitted to the catalog recommendation device 320. The catalog storage 310 may obtain information about a service category to be registered and an associated utilized service capability list from a catalog administrator or from the catalog recommendation device 320.

According to certain embodiments, in operation 1303, the catalog storage 310 may register a service. Various services developed by developers may be registered in the catalog storage 310, where the services may be registered subordinate to a specific service category. When registering the service, the catalog storage 310 may define a utilized device capability list utilized to perform the service and may store the utilized device capability list in association with the service. According to an embodiment, for a service called a home monitoring service, a motion sensor capability and a video capturing capability may be utilized to perform the service, and the service may correspond to a security service category. On the basis of this information, the catalog storage 310 may store the home monitoring service subordinate to the security service category and may define and store a motion sensor and video capturing in an associated utilized device capability list.

According to certain embodiments, the catalog storage 310 may also define and store a utilized service capability list for the registered service. According to an embodiment, the utilized service capability list for the service may include elements and conditions about the presence or absence of each device in the utilized device capability list for performing the service. For example, a service for which a utilized service capability list is defined may be recommended when all conditions in the utilized service capability list defined by the catalog recommendation device 320 or some of the conditions, if particular, are satisfied. When a utilized service capability list is defined for a specific service, the catalog storage 310 may transmit the service and the utilized service capability list associated with the service to the catalog recommendation device 320.

The catalog storage 310 may obtain information about a service to be registered, an associated utilized device capability list, and/or an associated utilized service capability list from a developer or the catalog administrator or may obtain the same from the catalog recommendation device 320.

According to certain embodiments, in operation 1305, the catalog storage 310 may receive a service information request from the terminal device 330. The service information request may include a specific service category or may include a specific service.

According to certain embodiments, when the service information request includes a specific service category, the catalog storage 310 may transmit information about all services subordinate to the service category to the terminal device 330 in operation 1307. For example, the catalog storage 310 may also transmit a utilized device capability list stored in association with each service to the terminal device 330.

According to certain embodiments, when the service information request includes a specific service, the catalog storage 310 may transmit information about the service to the terminal device 330 in operation 1307. For example, the information about the service may include a utilized device capability list for the service.

Figure 14:
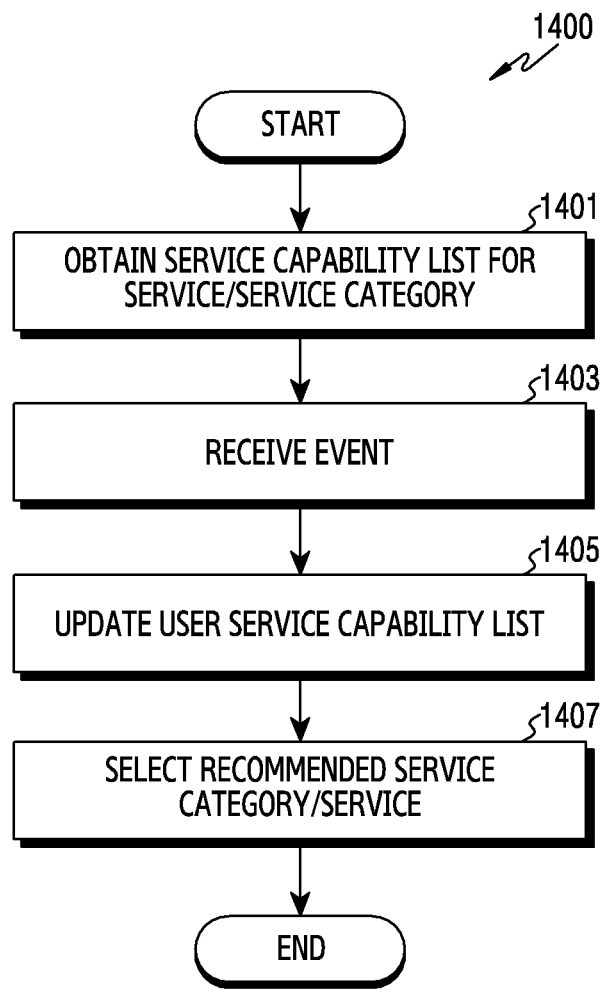
FIG. 14 is a flowchart illustrating an operation of a category recommendation device for recommending a service category suitable for a user according to certain embodiments.

FIG. 14 is a flowchart 1400 illustrating an operation of a catalog recommendation device 320 for recommending a service category suitable for a user according to certain embodiments. The subject of the operation in the flowchart 1400 illustrated in FIG. 14 may be understood as a catalog recommendation device (e.g., the catalog recommendation device 320 of FIG. 3), and the catalog recommendation device 320 of FIG. 3 may be configured in a server (e.g., the server 108 of FIG. 1) or an electronic device (e.g., the electronic device 101 of FIG. 1 or the electronic device 210 of FIG. 2).

According to certain embodiments, in operation 1401, the catalog recommendation device 320 may obtain a utilized service capability list for each service and/or service category used to recommend a service or a service category. According to an embodiment, the catalog recommendation device 320 may receive the utilized service capability list for each service and/or service category from the catalog storage 310.

According to certain embodiments, in operation 1403, the catalog recommendation device 320 may receive a user-related event. In an embodiment, the catalog recommendation device 320 may collect various events that occur through various devices or web services in the IoT cloud 200 of the user illustrated in FIG. 2. In addition, the catalog recommendation device 320 may collect an event, such as connection of a new device to the IoT cloud or disconnection of an existing device. In another embodiment, as illustrated in FIG. 9, the catalog recommendation device 320 may receive a home location designation event of the user from the IoT cloud, may receive an event that age information has been set from the user's account information, may receive a time information event from a time server.

According to certain embodiments, in operation 1405, the catalog recommendation device 320 may update a service capability list of the user. For example, the catalog recommendation device 320 may update the service capability list of the user whenever an event is received in operation 1403. In an embodiment, when it is recognized that the user's home location is "Songpa-gu, Seoul" from the home location designation event of the user, the catalog recommendation device 320 may update a home location element in the service capability list of the user to "Songpa-gu, Seoul." In another embodiment, when it is recognized that the user is in his/her 30s from the user's age information setup event, the catalog recommendation device 320 may update an age element in the service capability list of the user to the 30s.

According to certain embodiments, in operation 1407, the catalog recommendation device 320 may select a service and/or a service category to be recommended to the user. For selection, the catalog recommendation device 320 may compare the service capability list of the user updated in real time in operation 1405 with the utilized service capability list for the service and/or service category obtained in operation 1401. In an embodiment, the catalog recommendation device 320 may determine whether each element included in the service capability list of the user satisfies a condition for the element included in the utilized service capability list for the service and/or service category. The catalog recommendation device 320 may select a service and/or a service category that satisfy conditions for all elements included in the utilized service capability list as a recommended service and/or service category.

According to certain embodiments, the catalog recommendation device 320 may select a specific service and/or service category as a recommended service and/or service category even though the service and/or service category do not satisfy the conditions for all elements included in the utilized service capability list. For example, the catalog recommendation device 320 may assign a weighting to each element included in the utilized service capability list and may select a service and/or service category having the sum of weightings for elements satisfying the conditions that is equal to or greater than a specified value or a specified ratio with respect to the sum of all weightings as a recommended service and/or service category.

Figure 15:
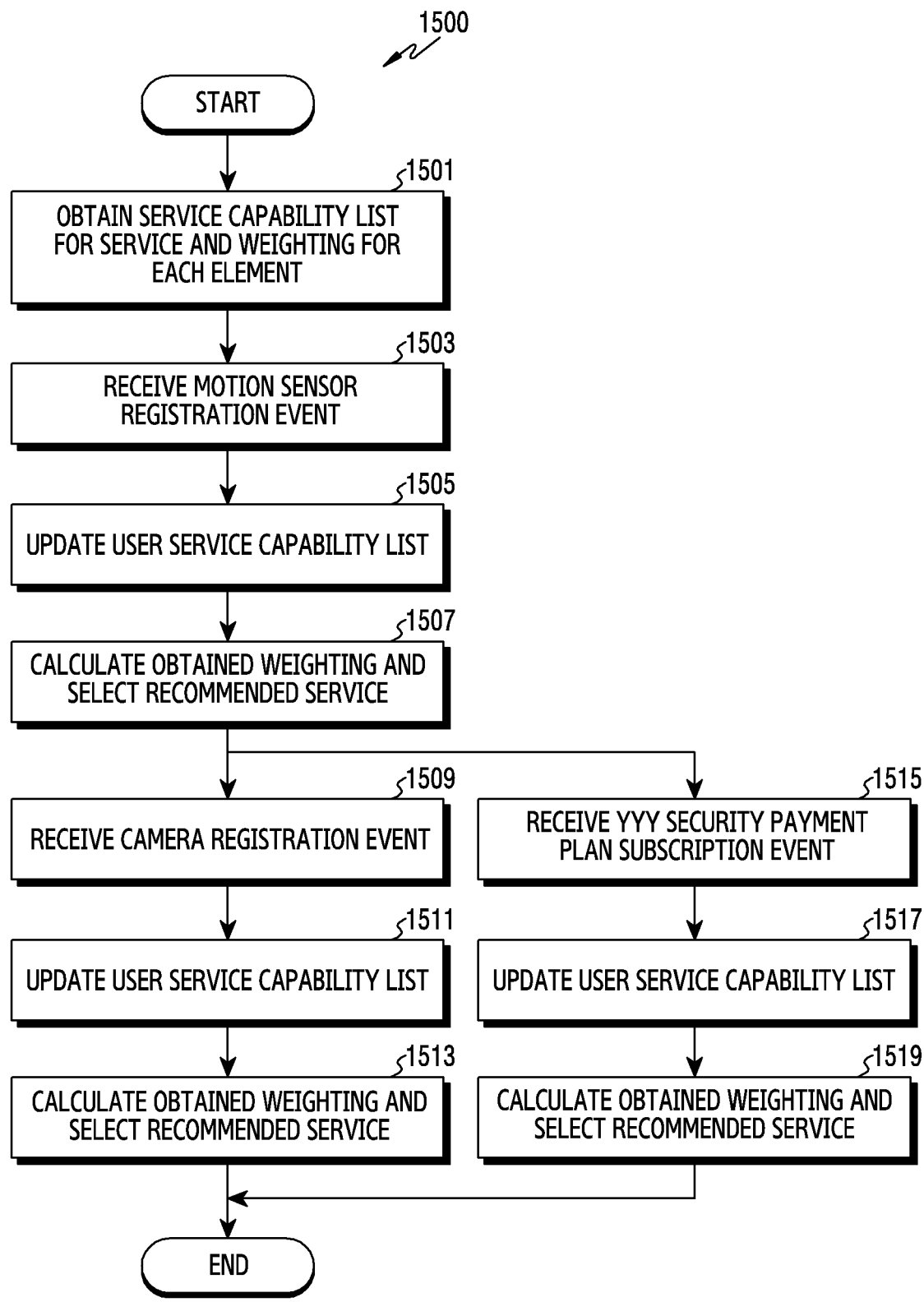
FIG. 15 is a flowchart illustrating an operation of a category recommendation device assigning a weighting to an element in a utilized service capability list and selecting a recommended service according to an obtained weightings according to certain embodiments.

FIG. 15 is a flowchart 1500 catalog recommendation device 320 assigning a weighting to an element in a utilized service capability list and selecting a recommended service according to an obtained weightings according to certain embodiments. The subject of the operation in the flowchart 1500 illustrated in FIG. 15 may be understood as a catalog recommendation device (e.g., the catalog recommendation device 320 of FIG. 3), and the catalog recommendation device 320 of FIG. 3 may be configured in a server (e.g., the server 108 of FIG. 1) or an electronic device (e.g., the electronic device 101 of FIG. 1 or the electronic device 210 of FIG. 2).

According to certain embodiments, in operation 1501, the catalog recommendation device 320 may obtain a utilized service capability list for a service and a weighting for each element. For example, the catalog recommendation device 320 may obtain a utilized service capability list for each security service in a security service category. The obtained utilized service capability list for each security service may be configured as illustrated in Table 1, and a weighting may be assigned to each element in the utilized service capability list. The weighting may be assigned in advance by a catalog administrator or a developer or may be assigned by the catalog recommendation device 320. According to an embodiment, utilized service capability lists for respective services in the security service category and assigned weightings may be as illustrated in Table 1.

TABLE 1

| Service | Utilized service capability list | Assigned weighting | Obtained weighting |
|---|---|---|---|
| General security service | Camera registration | 10 | 0 |
| Advanced security service | Camera registration | 7 | 3 |
|  | Motion sensor registration | 3 |  |
| Total security service | Camera registration | 6 | 2 |
|  | Motion sensor registration | 2 |  |
|  | Multipurpose sensor registration | 2 |  |
| YYY security service | YYY security payment plan subscription | 7 | 1 |
|  | Camera registration | 1 |  |
|  | Motion sensor registration | 1 |  |
|  | Multipurpose sensor registration | 1 |  |

According to certain embodiments, in operation 1503, the catalog recommendation device 320 may receive an event that a motion sensor has been registered in the IoT cloud. In operation 1505, the catalog recommendation device 320 may update the service capability list of the user with the registration of the motion sensor. In operation 1507, the catalog recommendation device 320 may calculate the sum of weightings obtained by the respective services illustrated in Table 1. According to the embodiment of Table 1, due to the event that the motion sensor has been registered, the catalog recommendation device 320 may determine that a weighting obtained by a general security service is 0, a weighting obtained by an advanced security service is 3, a weighting obtained by a total security service is 1, and a weighting obtained by a YYY security service is 1. Since the sum of the weightings obtained by the respective services is smaller than a specified weighting (e.g., 7), the catalog recommendation device 320 may not select any service for recommendation.

According to certain embodiments, in operation 1509, the catalog recommendation device 320 may receive an event that a camera has been registered from the IoT cloud. In operation 1511, the catalog recommendation device 320 may update the service capability list of the user with the registration of the camera. In operation 1513, the catalog recommendation device 320 may calculate an obtained weighting and may select a recommended service. For example, the catalog recommendation device 320 may recognize that an obtained weighting of the general security service is 10, an obtained weighting of the advanced security service is also 10, an obtained weighting of the total security service is 8, and an obtained weighting of the YYY security service is 2 in Table 1. According to an embodiment, the catalog recommendation device 320 may select the general security service and the advanced security service which have the highest weighting as recommended services. According to another embodiment, the catalog recommendation device 320 may select the general security service, the advanced security service, and the total security service which have a weighting higher than a specified weighting (e.g., 7) as recommended services and may transmit the general security service, the advanced security service, and the total security service to the terminal device 330. According to still another embodiment, the catalog recommendation device 320 may transmit information about all services included in a service category of the recommended service to the terminal device 330. According to an embodiment, the catalog recommendation device 320 may transmit a weighting for each service along with the service.

According to another embodiment, in operation 1515, the catalog recommendation device 320 may receive an event that the user has subscribed to a YYY security payment plan. In operation 1517, the catalog recommendation device 320 may update the service capability list of the user with the subscription of an YYY security payment plan element. In operation 1519, the catalog recommendation device 320 may calculate an obtained weighting and may select a recommended service. For example, the catalog recommendation device 320 may recognize that an obtained weighting of the general security service is 0, an obtained weighting of the advanced security service is also 3, an obtained weighting of the total security service is 2, and an obtained weighting of the YYY security service is 8 in Table 1 and may select the YYY security service having the obtained weighting greater than a specified value (e.g., 7) as a recommended service.

The embodiment of FIG. 15 shows that a specific service is recommended by setting a weighting according to satisfied conditions in a utilized service capability list for a plurality of services included in a service category. When all conditions in the utilized service capability list for the service category are satisfied and thus information about the service category is transmitted to the terminal device 330, the catalog recommendation device 320 may also transmit weightings for the respective services included in the service category as illustrated in the embodiment of FIG. 15. The terminal device 330 may arrange the services using the received weightings and may generate a catalog, which will be described again below.

Figure 16:
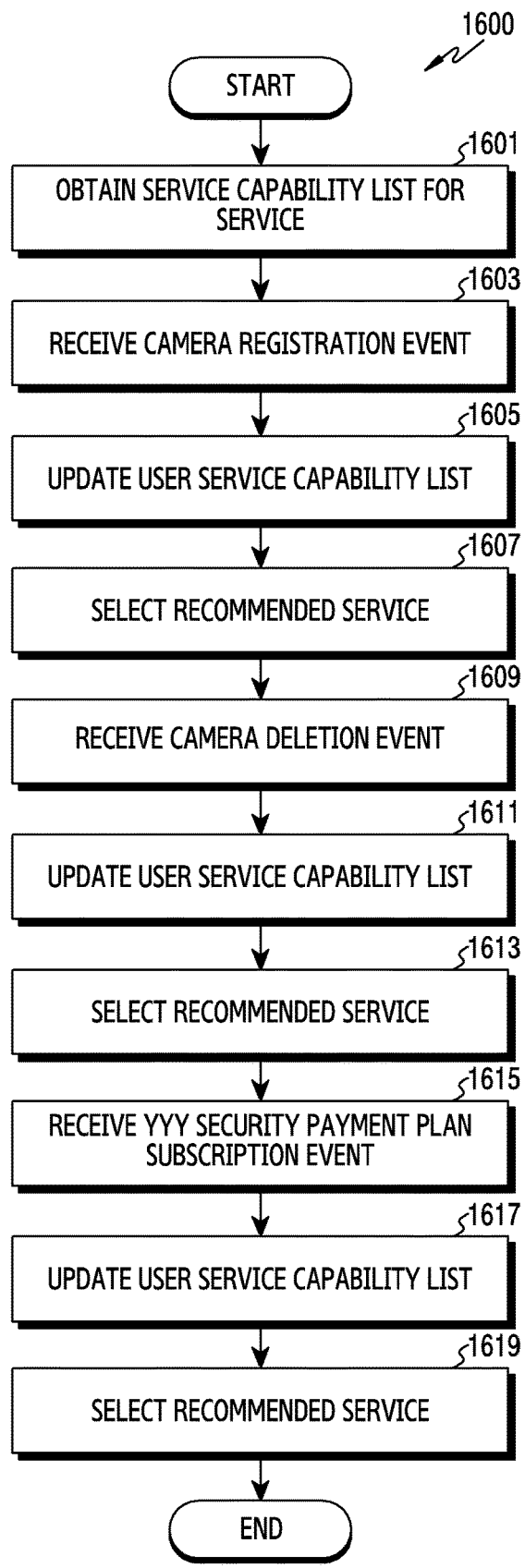
FIG. 16 is a flowchart illustrating another operation of a category recommendation device for recommending a service category suitable for a user according to certain embodiments.

FIG. 16 is a flowchart 1600 illustrating an operation of a catalog recommendation device 320 for recommending a service category suitable for a user according to certain embodiments. The subject of the operation in the flowchart 1600 illustrated in FIG. 16 may be understood as a catalog recommendation device (e.g., the catalog recommendation device 320 of FIG. 3), and the catalog recommendation device 320 of FIG. 3 may be configured in a server (e.g., the server 108 of FIG. 1) or an electronic device (e.g., the electronic device 101 of FIG. 1 or the electronic device 210 of FIG. 2).

According to certain embodiments, in operation 1601, the catalog recommendation device 320 may obtain a utilized service capability list for each service and/or service category used to recommend a service or a service category. According to an embodiment, the catalog recommendation device 320 may receive the utilized service capability list for each service and/or service category from the catalog storage 310.

According to certain embodiments, in operation 1603, the catalog recommendation device 320 may receive a user-related event. In an embodiment, the catalog recommendation device 320 may collect various events that occur through various devices or web services in the IoT cloud 200 of the user illustrated in FIG. 2. In another embodiment, the catalog recommendation device 320 may collect an event, such as connection of a new device to the IoT cloud or disconnection of an existing device. In this embodiment, the catalog recommendation device 320 may receive an event that a camera has been connected to or registered in the IoT cloud.

According to certain embodiments, in operation 1605, the catalog recommendation device 320 may update a service capability list of the user. For example, the catalog recommendation device 320 may update the service capability list of the user whenever an event is received in operation 1603. In this embodiment, the catalog recommendation device 320 may update the service capability list to indicate that a service capability element of camera registration has been registered.

According to certain embodiments, in operation 1607, the catalog recommendation device 320 may select a service and/or a service category to be recommended to the user. For example, the catalog recommendation device 320 may compare the service capability list of the user updated in real time in operation 1605 with the utilized service capability list for the service and/or service category obtained in operation 1601. In an embodiment, the catalog recommendation device 320 may determine whether each element included in the service capability list of the user satisfies a condition for the element included in the utilized service capability list for the service and/or service category. The catalog recommendation device 320 may select a service and/or a service category that satisfy conditions for all elements included in the utilized service capability list as a recommended service and/or service category. According to an embodiment of FIG. 15, the catalog recommendation device 320 may select a general security service included in a security service category as a recommended service and may transmit the general security service to the terminal device 330.

According to certain embodiments, in operation 1609, the catalog recommendation device 320 may further receive a user-related event. In an embodiment, the catalog recommendation device 320 may receive an event that the camera has been disconnected from the IoT cloud. That is, it may be indicated that the camera connected to the IoT cloud has been disconnected due to a failure or according to the user's intent.

According to certain embodiments, in operation 1611, the catalog recommendation device 320 may update the service capability list of the user. The catalog recommendation device 320 may update the service capability list to indicate that the service capability element of camera registration is not registered.

According to certain embodiments, in operation 1613, the catalog recommendation device 320 may select a service and/or a service category to be recommended to the user. For example, the catalog recommendation device 320 may compare the service capability list of the user updated in real time in operation 1611 with the utilized service capability list for the service and/or service category obtained in operation 1601. In an embodiment, the catalog recommendation device 320 may determine whether each element included in the service capability list of the user satisfies a condition for the element included in the utilized service capability list for the service and/or service category. The catalog recommendation device 320 may select a service and/or a service category that satisfy conditions for all elements included in the utilized service capability list as a recommended service and/or service category. When the service capability list is updated to indicate that the camera is not registered in operation 1611, the catalog recommendation device 320 may determine that there is no service and/or service category to be recommended and may not transmit any recommended service and/or service category to the terminal device 330.

According to certain embodiments, in operation 1615, the catalog recommendation device 320 may receive a different user-related event. In an embodiment, the catalog recommendation device 320 may receive an event of a subscription to a YYY security payment plan.

According to certain embodiments, in operation 1617, the catalog recommendation device 320 may update the service capability list of the user. The catalog recommendation device 320 may update the service capability list to indicate that a service capability element of a subscription to a YYY security payment plan is established.

According to certain embodiments, in operation 1619, the catalog recommendation device 320 may select a service and/or a service category to be recommended to the user. For example, the catalog recommendation device 320 may compare the service capability list of the user updated in real time in operation 1617 with the utilized service capability list for the service and/or service category obtained in operation 1601. In an embodiment, the catalog recommendation device 320 may determine whether each element included in the service capability list of the user satisfies a condition for the element included in the utilized service capability list for the service and/or service category. The catalog recommendation device 320 may select a service and/or a service category that satisfy conditions for all elements included in the utilized service capability list as a recommended service and/or service category. According to an embodiment of FIG. 15, the catalog recommendation device 320 may select a YYY security service included in the security service category as a recommended service and may transmit the YYY security service to the terminal device 330.

As described above, the catalog recommendation device 320 may update the service capability list of the user whenever a new event is received while monitoring a user-related event in real time or periodically. In addition, the catalog recommendation device 320 may compare the updated service capability list of the user with the utilized service capability list for the service category and/or the service, thereby selecting a recommended service category and/or a service.

Figure 17:
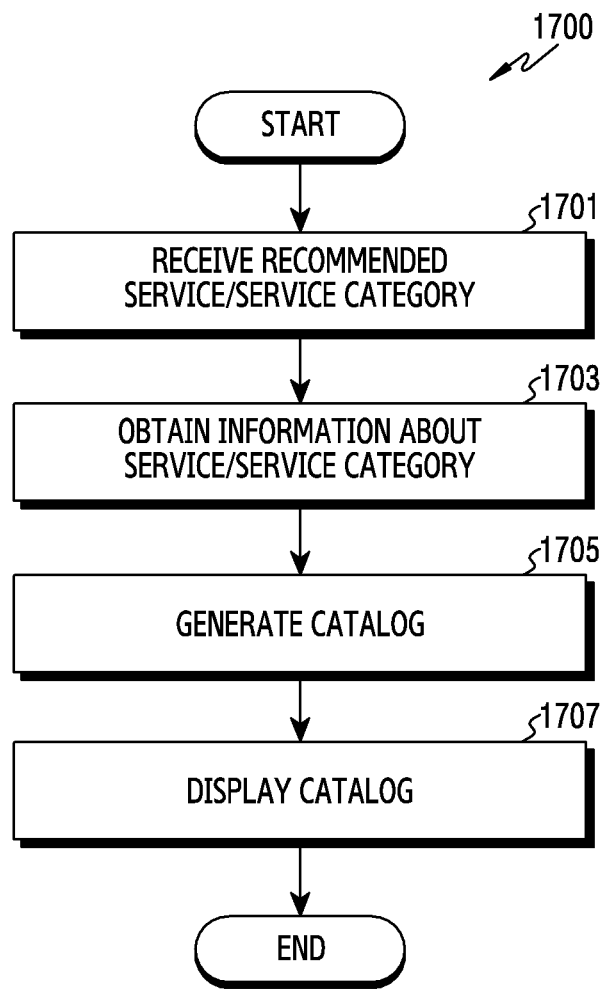
FIG. 17 is a flowchart illustrating an operation of a terminal device for recommending a service category suitable for a user according to certain embodiments.

FIG. 17 is a flowchart 1700 illustrating an operation of a terminal device 330 for recommending a service category suitable for a user according to certain embodiments. The subject of the operation in the flowchart 1700 illustrated in FIG. 17 may be understood as a terminal device (e.g., the terminal device 330 of FIG. 3) or an electronic device (e.g., the electronic device 101 of FIG. 1 or the electronic device 210 of FIG. 2).

According to certain embodiments, in operation 1701, the terminal device 330 may receive a recommended service and/or service category from the catalog recommendation device 320. For example, the terminal device 330 may receive, from the catalog recommendation device 320, weighting information obtained by quantifying satisfaction of a condition in a utilized service capability list for the recommended service and/or services included in the recommended service category together with the recommended service and/or service category.

According to certain embodiments, in operation 1703, the terminal device 330 may request and receive information about the received service and/or service category from the catalog storage 310, thereby obtaining the information about the service and/or service category. For example, the information about the service may include information related to the service. In another example, the information about the service category may include information about all services included in the service category. Information about each service may include not only general information about the service but also a utilized device capability list for performing the service.

According to certain embodiments, in operation 1705, the terminal device 330 may generate a catalog. When there is one recommended service, it is not particularly particular to generate a catalog. However, when a service category is recommended or when a plurality services is recommended, a catalog may be configured and generated such that services are sequentially displayed in order of arrangement by performing arrangement for determining the order in which services are to be displayed.

According to certain embodiments, the terminal device 330 may determine the suitability of the recommended services and may arrange the services on the basis of the suitability. According to an embodiment, the terminal device 330 may arrange the services in order from a higher weighting on the basis of weightings received from the catalog recommendation device 320. In another embodiment, the terminal device 330 may compare a utilized device capability list for each service with a device capability list of the user and may arrange the services according to the degree of consistency therebetween. When a motion sensor and a camera are connected to the user's IoT cloud, a motion sensor and video capturing may be registered in the device capability list of the user. According to an embodiment, a home monitoring service as one recommended service may include a motion sensor and video capturing in a utilized device capability list, service 1 may include a smoke sensor in a utilized device capability list, and service 2 may include video capturing and a leak sensor in a utilized device capability list. In an embodiment, the terminal device 330 may arrange the services such that the home monitoring service having the utilized device capability list consistent with the device capability list of the user has the highest priority, service 2 having one consistent element has the second highest priority, and service 3 having no consistent element has the last priority.

According to an embodiment, the terminal device 330 may arrange priorities of the services on the basis of the user's feedback (e.g., 'Like'). According to another embodiment, the terminal device 330 may arrange the services to have a higher priority on the basis of at least one of the total configuration cost utilized to implement a service, services suitable for the number of rooms in the user's house, services suitable for the user's house size, services available via a specific object or a combination of objects connected to the user's IoT cloud, or services suitable for a particular time. The terminal device 330 may configure and generate a catalog such that a service having a higher priority is arranged at an upper position in the catalog according to the arranged priorities.

According to certain embodiments, in operation 1707, the terminal device 330 may display the generated catalog on a screen (e.g., the display device 160). A method for displaying the catalog on the screen may use at least one of a method of using a pop-up window illustrated in FIG. 4 or a method of displaying a list illustrated in FIG. 5.

According to certain embodiments, the terminal device 330 may highlight a specific service when displaying the catalog on the screen. In an embodiment, when the user satisfies both a utilized device capability list and a service capability list needed for a service, for example, when an object or a device needed for the service is connected to the user's IoT cloud and the user has all service capabilities needed for the service, the terminal device 330 may highlight the service to be distinguished from other services when displaying the service on the screen. When part of the utilized device capability list needed for the specific service and the service capability list are satisfied and part thereof are not satisfied, icons corresponding to respective device capabilities and/or service capabilities are displayed on the screen such that an unsatisfied capability and a satisfied capability may be distinguished. In an embodiment, the satisfied capability may be displayed in blue, and the unsatisfied capability may be displayed in black. Accordingly, it is possible to provide information such that the user can recognize an object, a device, or a service capability that the user needs to additionally have in order to use the specific service.

According to certain embodiments, using the foregoing method makes it possible to recommend a service suitable for the user or to display services suitable for the user arranged according to priorities, thereby improving the user's convenience.

According to certain embodiments, an operating method of an electronic device (e.g., the electronic device 101 of FIG. 1, the server 108 of FIG. 1, or the electronic device 210 of FIG. 2) may include: obtaining a service category including at least one service and a utilized service capability list for recommending the service category; receiving a user-related event; updating a service capability list of a user on the basis of the user-related event; and selecting a service category to be recommended by comparing the updated service capability list with the utilized service capability list.

According to certain embodiments, the method may further include: obtaining a utilized service capability list for each of at least part of the at least one service needed to recommend the at least part of the at least one service; and selecting a service to be recommended by comparing the updated service capability list with the utilized service capability list for the at least part of the service.

According to certain embodiments, the selecting of the service category to be recommended by comparing the updated service capability list with the utilized service capability list may include: determining whether values of elements in the updated service capability list entirely satisfy conditions for corresponding elements included in the utilized service capability list; and selecting the service category to be recommended on the basis of a determination result.

According to certain embodiments, the selecting of the service category to be recommended by comparing the updated service capability list with the utilized service capability list may include: determining whether values of elements in the updated service capability list partially satisfy conditions for corresponding elements included in the utilized service capability list; and selecting the service category to be recommended on the basis of a determination result.

According to certain embodiments, the selecting of the service category to be recommended by comparing the updated service capability list with the utilized service capability list may include: setting a weighting for each element included in the utilized service capability list; calculating a sum of weightings set for an element in the updated service capability list of which a value satisfies a condition for each corresponding element included in the utilized service capability list; determining whether the sum of the weightings is equal to or greater than a specified value or a specified ratio with respect to a sum of all weightings; and selecting the service category to be recommended on the basis of a determination result.

According to certain embodiments, the method may further include: generating a catalog on the basis of the at least one service included in the selected service category; and displaying the catalog to the user.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a communication module configured to communicate with an external device;
at least one processor operatively coupled to the communication module; and
at least one memory operatively coupled to the at least one processor,
wherein the at least one memory stores instructions executable by the at least one processor to cause the electronic device to:
obtain a utilized service capability list required for a plurality of service categories, each service category listing services providable to a user using one or more smart devices;
determine a weighting assigned to each of one or more elements included in the utilized service capability list;
in response to detecting a user-related event, update a service capability list of a user by identifying weighting obtained for at least one element associated with the user-related event among the one or more elements based on the determined weighting for the one or more elements in the utilized service capability list;
calculate a sum of weightings for each of the plurality of service categories in the updated service capability list of the user;
select a service category from among the plurality of service categories to be recommended to the user based on the calculated sum of weightings in the updated service capability list of the user; and
transmit, to a terminal device of the user, information on the selected service category for providing a catalog guide of a recommended service to the user.

2. The electronic device of claim 1, wherein the instructions are further executable by the at least one processor to:
select an individual service listed in the selected service category for further recommendation to the user, by:
retrieving service-specific capability lists associated with each individual service included in the selected service category, and
comparing the updated service capability list of the user with each of the service-specific capability lists to identify a matching individual service to be recommended.

3. The electronic device of claim 1, wherein a condition for recommending any service category to the user is stored in the at least one memory, and
wherein the instructions are further executable by the at least one processor:
comparing the each of the one or more elements included in the utilized service capability list with one or more elements included in the updated service capability list of the user,
selecting the service category to be recommended to the user when comparing indicates that, for the selected service category, an entirety of the condition is satisfied.

4. The electronic device of claim 1, wherein a condition for recommending any service category to the user is stored in the at least one memory, and
wherein the instructions are further executable by the at least one processor to:
comparing the each of the one or more elements included in the utilized service capability list with one or more elements included in the updated service capability list of the user,
selecting the service category to be recommended to the user when comparing indicates that, for the selected service category, a portion of the condition is satisfied.

5. The electronic device of claim 4, the instructions are further executable to cause the at least one processor to:
calculate a sum of weightings set for each of the one or more elements which matches an element of the updated service capability list of the user,
wherein the service category is selected when the portion of the condition is satisfied by the calculated sum being equal to or greater than a predetermined threshold value.

6. The electronic device of claim 2, wherein comparing the updated service capability list of the user with each of the service-specific capability lists further comprises:

determining whether values of elements included in the updated service capability list of the user matches an entirety of values of elements included in each of the service-specific capability lists, wherein the individual service is selected for further recommendation when the entirety of values of elements in a service-specific capability list of the individual service matches an entirety the values of elements included in the updated service capability list of the user.

7. The electronic device of claim 6, wherein the entirety of values of elements in the service-specific capability list of the individual service further matches an entirety the values of elements included in a service capability list for the selected service.

8. The electronic device of claim 2, wherein an entirety of values of elements in the service-specific capability list of the individual service further partially matches values of elements included in a service capability list for the selected service.

9. The electronic device of claim 8, wherein a condition for recommending any service category to the user is stored in the at least one memory, and wherein a numerical weight is assigned to each of the one or more elements included in each service capability list, the instructions further executable to cause the at least one processor to:

calculate a sum of weightings set for each of the one or more elements which matches an element of the updated service capability list of the user, wherein the service category is selected when a portion of the stored condition is satisfied by the calculated sum being equal to or greater than a predetermined threshold value.

10. The electronic device of claim 1, further comprising:

a display device, wherein the instructions are further executable by the at least one processor to:

generate a user interface (UI) catalog guide based on at least one service included in the selected service category, the UI catalog guide including at least one of a list and a pop-up window; and display the UI catalog guide on the display device.

11. The electronic device of claim 10, wherein generating the UI catalog-guide includes arranging services included in the selected service category according to a prespecified arrangement order.

12. The electronic device of claim 11, wherein the instructions are further executable by the at least one processor to:

retrieve device capability lists for each service included in the selected service category, the device capability lists indicating smart-devices utilized to implement each service, and retrieving a user device capability list from user-related information, the user device capability list indicating devices associated with the user, wherein generating the UI catalog-guide includes comparing a device capability list for each service with the user device capability list, and wherein the prespecified arrangement order indicates that individual services, for which the user device capability list indicates a threshold number of matches, are assigned visual priority for display in the generated UI catalog guide.

13. A method of an electronic device, comprising:

obtaining a utilized service capability list required for a plurality of service categories, each service category listing services providable to a user using one or more smart devices;

wherein the plurality of service categories are retrieved from a transmission received by a communication module, or by extraction from a local memory;

determining a weighting assigned to each of one or more elements included in the utilized service capability list, in response to detecting a user-related event, updating, by a processor, a service capability list of a user by identifying a weighting obtained for at least one element associated with the user-related event among the one or more elements based on the determined weighting for the one or more elements in the utilized service capability;

calculating a sum of weightings for each of the plurality of service categories in the updated service capability list of the user;

selecting a service category from among the plurality of service categories to be recommended to the user based on the calculated sum of weightings in the updated service capability list of the user; and transmitting, to a terminal device of the user, information on the selected service category for providing a catalog guide of a recommended service to the user.

14. The method of claim 13, further comprising:

selecting an individual service listed in the selected service category for further recommendation to the user, by:

retrieving service-specific capability lists associated with each individual service included in the selected service category, and comparing the updated service capability list of the user with each of the service-specific capability lists to identify a matching individual service to be recommended.

15. The method of claim 13, wherein a condition for recommending any service category to the user is stored in the at least one memory, and wherein selecting the service category from among the plurality of service categories further includes:

comparing the each of the one or more elements included in the utilized service capability list with one or more elements included in the updated service capability list of the user, selecting the service category to be recommended to the user when the comparing indicates that, for the selected service category, an entirety of the condition is satisfied.

16. The method of claim 13, wherein a condition for recommending any service category to the user is stored in the at least one memory, and wherein selecting the service category from among the plurality of service categories further includes:

comparing the each of the one or more elements included in the utilized service capability list with one or more elements included in the updated service capability list of the user, selecting the service category to be recommended to the user when the comparing indicates that, for the selected service category, a portion of the condition is satisfied.

17. The method of claim 16, further comprising:
calculate a sum of weightings set for each of the one or more elements which matches an element of the updated service capability list of the user,
wherein the service category is selected when the portion of the condition is satisfied by the calculated sum being equal to or greater than a predetermined threshold value.

\* \* \* \* \*